United States Patent
Vergara et al.

(10) Patent No.: US 11,487,546 B2
(45) Date of Patent: Nov. 1, 2022

(54) CHANGE MANAGEMENT OF SERVICES DEPLOYED ON DATACENTERS CONFIGURED IN CLOUD PLATFORMS

(71) Applicant: salesforce.com, inc., San Francisco, CA (US)

(72) Inventors: Jeaneth Vergara, Granite Bay, CA (US); Arifullah Khan Pattan, Sunnyvale, CA (US)

(73) Assignee: Salesforce, Inc., San Francisco, CA (US)

( * ) Notice: Subject to any disclaimer, the term of this patent is extended or adjusted under 35 U.S.C. 154(b) by 89 days.

(21) Appl. No.: 17/148,363

(22) Filed: Jan. 13, 2021

(65) Prior Publication Data
US 2022/0222079 A1    Jul. 14, 2022

(51) Int. Cl.
*G06F 8/71* (2018.01)
*G06F 9/38* (2018.01)
*G06F 9/48* (2006.01)
*G06F 9/50* (2006.01)

(52) U.S. Cl.
CPC .............. *G06F 9/3869* (2013.01); *G06F 8/71* (2013.01); *G06F 9/4881* (2013.01); *G06F 9/5072* (2013.01)

(58) Field of Classification Search
CPC ..... G06F 8/60; G06F 8/65; G06F 8/71; G06F 9/3869; G06F 9/4881; G06F 9/5072
See application file for complete search history.

(56) References Cited

U.S. PATENT DOCUMENTS

| | | | | |
|---|---|---|---|---|
| 8,843,889 | B2* | 9/2014 | Anderson | G06F 8/70 717/122 |
| 2013/0268913 | A1* | 10/2013 | Anderson | G06F 8/70 717/120 |
| 2019/0129701 | A1 | 5/2019 | Hawrylo et al. | |
| 2020/0104107 | A1* | 4/2020 | Hodder | G06F 8/71 |
| 2020/0110598 | A1* | 4/2020 | Liu | G06F 21/31 |
| 2020/0356403 | A1 | 11/2020 | Kasha et al. | |
| 2021/0389938 | A1* | 12/2021 | Kulkarni | G06Q 30/0641 |

(Continued)

OTHER PUBLICATIONS

Burns, E. et al., "Continuous Delivery with Spinnaker," O'Reilly Media, May 11, 2018, XP055626768, pp. 1-81.

(Continued)

*Primary Examiner* — Jacob Petranek
(74) *Attorney, Agent, or Firm* — Fenwick & West LLP

(57) ABSTRACT

Computing systems, for example, multi-tenant systems deploy software artifacts in data centers created in a cloud platform using a cloud platform infrastructure language that is cloud platform independent. The system receives an artifact version map that identifies versions of software artifacts for datacenter entities. The system generates a master pipeline for deploying services on a target cloud platform. The master pipeline includes a change management stage comprising instructions for interacting with a change management system. The execution of the change management stage of a pipeline provides a status of deployment of one or more services to the change management system. The details recorded can be used for auditing, for example, to determine why certain change in the configuration of services of the datacenter was made.

20 Claims, 17 Drawing Sheets

1200

(56) References Cited

U.S. PATENT DOCUMENTS

2021/0405985 A1* 12/2021 Shteyman ................. G06F 8/71

OTHER PUBLICATIONS

PCT International Search Report and Written Opinion, PCT Application No. PCT/US2021/015827, dated Nov. 5, 2021, 21 pages.

Burns, E., "Why Spinnaker matters to CI/CD," Aug. 27, 2019, seven pages, [Online] [Retrieved on Jan. 19, 2021] Retrieved from the Internet <URL: https://opensource.com/article/19/8/why-spinnaker-matters-cicd>.

Mukherjee, J., "What is a continuous delivery pipeline?" Date Unknown, 14 pages, [Online] [Retrieved on Jan. 19, 2021] Retrieved from the Internet <URL: https://www.atlassian.com/continuous-delivery/pipeline>.

Thakur, V., "Continuous Delivery Pipeline for Kubernetes Using Spinnaker," May 27, 2020, 21 pages, [Online] [Retrieved on Jan. 19, 2021] Retrieved from the Internet <URL: https://www.metricfire.com/blog/continuous-delivery-pipeline-for-kubernetes-using-spinnaker/?GAID=undefined&GAID=undefined>.

* cited by examiner

CHANGE MANAGEMENT OF SERVICES DEPLOYED ON DATACENTERS CONFIGURED IN CLOUD PLATFORMS

BACKGROUND

Field of Art

This disclosure relates in general to continuous delivery of software releases in cloud computing platforms, and in particular to management of changes in software artifacts deployed on data centers configured in cloud computing platforms.

Description of the Related Art

Organizations are increasingly replying on cloud platforms (or cloud computing platforms) such as AWS (AMAZON WEB SERVICES), GOOGLE cloud platform, MICROSOFT AZURE, and so on for their infrastructure needs. Cloud platforms provide servers, storage, databases, networking, software, and so on over the internet to organizations. Conventionally, organizations maintained data centers that house hardware and software used by the organization. However, maintaining data centers can result in significant overhead in terms of maintenance, personnel, and so on. As a result, organizations are shifting their data centers to cloud platforms that provide scalability and elasticity of computing resources.

Organizations maintain cloud infrastructure on cloud platforms using continuous delivery platforms that can manage and deploy applications on cloud platforms. Such continuous delivery platforms allow organizations to simplify software deployment process and manage applications, firewalls, clusters, servers, load balancers, and other computing infrastructure on the cloud platform. However, deploying software releases for services provided on a cloud platform using a continuous delivery platform can be complex. For example, different versions of software may have to be deployed on different services running on different cloud computing resources. Furthermore, each cloud platform uses different tools for managing the resources.

A large system such as a multi-tenant system may manage services for a large number of organizations representing tenants of the multi-tenant system and may interact with multiple cloud platforms. A multi-tenant system may have to maintain several thousand such data centers on a cloud platform. Each datacenter may have different requirements for software releases. A continuous delivery platform simplifies the process of releasing and deploying software artifacts, thereby resulting in frequent software releases. Furthermore, several users and teams of users may be involved in a software release associated with a service. As a result, tracking changes made to services deployed on datacenter configured on cloud platforms has become complex since frequent changes may be made to source code as well as system configurations. Tracking changes to services deployed in a large system is cumbersome since the relevant information is either difficult to access or not available. This results in high maintenance cost for the multi-tenant system for supporting and tracking software releases and changes to software releases on data centers configured on cloud platforms.

Figure 1:
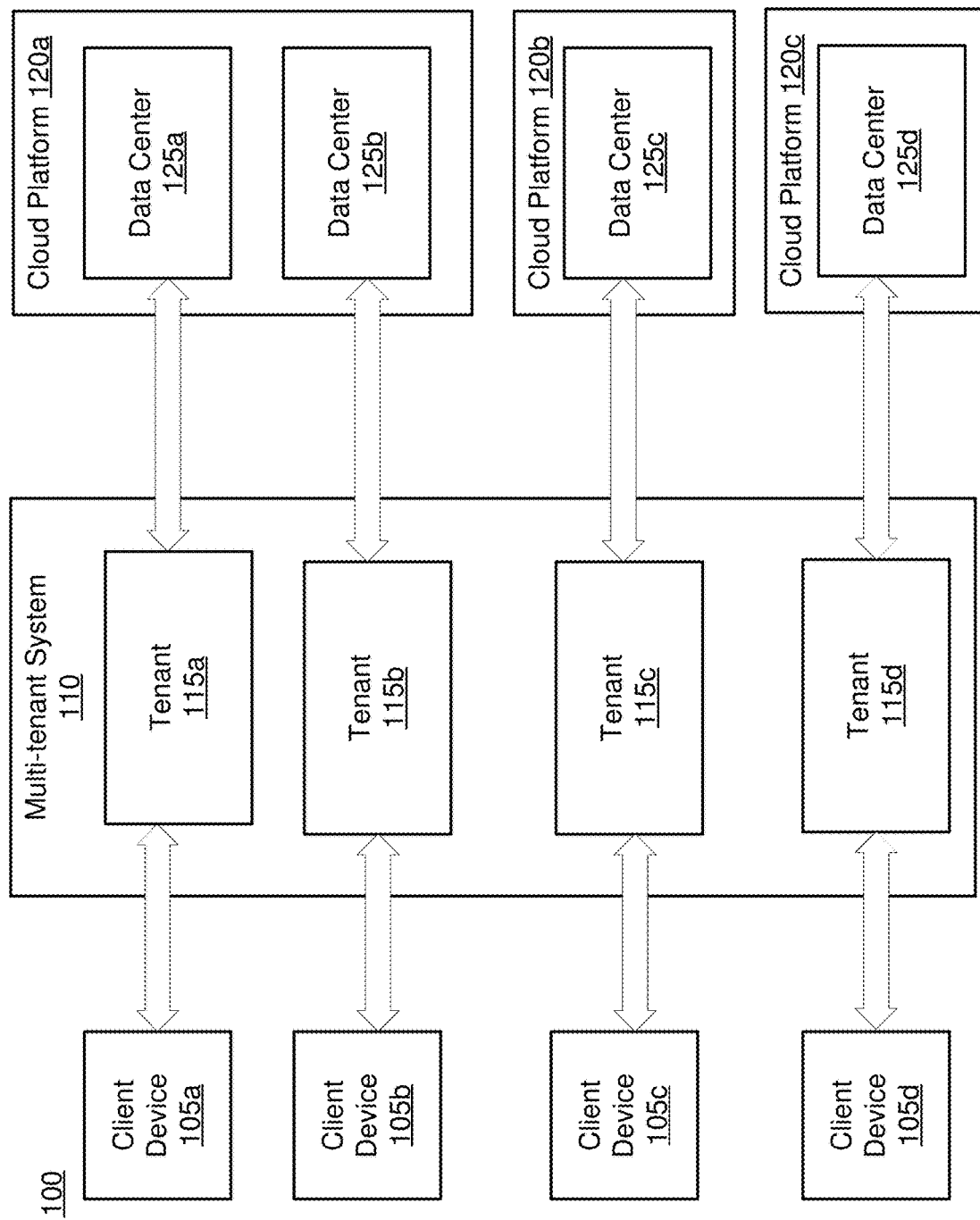
FIG. 1 is a block diagram of a system environment illustrating a multi-tenant system configuring data centers on cloud platforms according to an embodiment.

The figures depict various embodiments for purposes of illustration only. One skilled in the art will readily recognize from the following discussion that alternative embodiments of the structures and methods illustrated herein may be employed without departing from the principles of the embodiments described herein.

The figures use like reference numerals to identify like elements. A letter after a reference numeral, such as "115a," indicates that the text refers specifically to the element having that particular reference numeral. A reference numeral in the text without a following letter, such as "115," refers to any or all of the elements in the figures bearing that reference numeral.

DETAILED DESCRIPTION

Cloud platforms provide computing resources, such as storage, computing resources, applications, and so on to computing systems on an on-demand basis via a public network such as internet. Cloud platforms allow enterprises to minimize upfront costs to set up computing infrastructure and also allow enterprises to get applications up and running faster with less maintenance overhead. Cloud platforms also allow enterprises to adjust computing resources to rapidly fluctuating and unpredictable demands. Enterprises can create a data center using a cloud platform for use by users of the enterprise. However, implementing a data center on each cloud platform requires expertise in the technology of the cloud platform.

Embodiments create data centers in a cloud platform using a cloud platform infrastructure language that is cloud platform independent. The system receives a cloud platform independent declarative specification of a data center. The declarative specification describes the structure of the data center and may not provide instructions specifying how to create the data center. The cloud platform independent declarative specification is configured to generate the data center on any of a plurality of cloud platforms and is specified using a cloud platform infrastructure language. The system receives information identifying a target cloud platform for creating the data center and compiles the cloud platform independent declarative specification to generate a cloud platform specific data center representation. The system sends the cloud platform specific data center representation and a set of instructions for execution on the target cloud platform. The target cloud platform executes the instructions to configure the data center using the platform specific data center representation. The system provides users with access to the computing resources of the data center configured by the cloud platform.

In one embodiment, the system performs operations related to software releases on datacenters configured on a cloud platform, for example, deploying software releases, provisioning resources, performing rollback of software releases, and so on. The system accesses a data center configured on a target cloud platform. The datacenter is generated based on a cloud platform independent declarative specification comprising a hierarchy of data center entities. Each data center entity comprises one or more of (1) a service or (2) one or more other data center entities. The system generates a cloud platform independent master pipeline that comprises: (1) a sequence of stages for deployment of a software artifact, for example, a development stage, a test stage, and a production stage, and (2) criteria for promoting the software artifact from one stage to a subsequent stage of the sequence of stages. The system compiles the cloud platform independent master pipeline to generate a cloud platform dependent detailed pipeline for the target cloud platform with instructions for performing operations related to services according to the layout of datacenter defined by the declarative specification. The system executes the cloud platform dependent detailed pipeline on the target cloud platform, for example, to deploy software releases on datacenter entities of the datacenter.

In one embodiment, the system accesses the data center configured on a target cloud platform. The system receives a cloud platform independent artifact version map associating data center entities of the data center with versions of software artifacts targeted for deployment on the datacenter entities. Each software artifact comprises executable instructions associated with a service configured for execution on one or more cloud platforms. The system generates a cloud platform specific master pipeline for the target cloud platform based on the cloud platform independent artifact version map. The cloud platform specific master pipeline comprises instructions to perform operations such as build and deploy appropriate versions of deployment artifacts for services on data center entities in accordance with the cloud platform independent version map. The system transmits the cloud platform specific deployment pipeline to the target cloud platform for execution. The artifact version map and the master pipelines can be used to perform various actions related to services including deployment of service, destroying services, provisioning resources for services, destroying resources for services, and so on.

According to an embodiment, the system accesses a datacenter configured on a target cloud platform. The system receives information describing a modification of the set of services executing on the datacenter, for example, the modification may add a new service, remove a service, change configuration of a service, deploy a new version of a software artifact associated with a service, and so on. In an embodiment, the system receives a modified artifact version map and determines the modification of the set of services executing on the datacenter by comparing the received artifact version map with a previously received artifact version map.

The system generates a master pipeline for deploying services on a target cloud platform. The master pipeline includes a plurality of stages comprising instructions for deploying services. A stage may correspond to a system environment, for example, a development environment, a test environment, or a production environment. The pipeline includes a change management stage comprising instructions for interacting with a change management system. For example, the change management stage of a generated pipeline may include instructions to wait for an approval to proceed to the next stage. Accordingly, the system proceeds to the next stage after receiving the approval. The change management stage may include instructions to provide information describing the modification to the configuration of the datacenter entity for storing as records in the change management system.

The system compiles the master pipeline to generate a set of pipelines corresponding to the set of services. Each generated pipeline includes a change management stage. The system sends the set of pipelines for execution, for example, to a pipeline execution engine, running on the target cloud platform. Execution of the change management stage of a pipeline provides a status of deployment of one or more services to the change management system.

According to an embodiment, the system receives an auditing request for a specific change in a particular service deployed in the datacenter. Responsive to receiving the auditing request, the system identifies a status of deployment of the particular service from the change management system and provides the identified status in response to the auditing request.

A cloud platform is also referred to herein as a substrate. The declarative specification of data center is substrate independent or substrate agnostic. If operations related to a datacenter such as deployment of software releases, provisioning of resources, and so on are performed using conventional techniques, the user has to provide cloud platform specific instructions. Accordingly, the user needs expertise of the cloud platform being used. Furthermore, the instructions are cloud platform specific and are not portable across multiple platforms. For example, the instructions for deploying software on an AWS cloud platform are different from instructions on a GCP cloud platform. A developer needs to understand the details of how each feature is implemented on that specific cloud platform. The system disclosed allows users to perform operations on datacenters using instructions that are cloud platform independent and can be executed on any cloud platform selected from a plurality of cloud platforms.

The cloud platform infrastructure language may be referred to as a domain specific language (DSL). The system may represent a multi-tenant system but is not limited to multi-tenant systems and can be any online system or any computing system with network access to the cloud platform.

Overall System Environment

FIG. 1 is a block diagram of a system environment illustrating a multi-tenant system configuring data centers on cloud platforms according to an embodiment. The system environment 100 comprises a multi-tenant system 110, one or more cloud platforms 120, and one or more client devices 105. In other embodiments, the system environment 100 may include more or fewer components.

The multi-tenant system 110 stores information of one or more tenants 115. Each tenant may be associated with an enterprise that represents a customer of the multi-tenant system 110. Each tenant may have multiple users that interact with the multi-tenant system via client devices 105.

A cloud platform may also be referred to as a cloud computing platform or a public cloud environment. A tenant may use the cloud platform infrastructure language to provide a declarative specification of a datacenter that is created on a target cloud platform 120 and to perform operations using the datacenter, for example, provision resources, perform software releases and so on. A tenant 115 may create one or more data centers on a cloud platform 120. A data center represents a set of computing resources including servers, applications, storage, memory, and so on that can be used by users, for example, users associated with the tenant. Each tenant may offer different functionality to users of the tenant. Accordingly, each tenant may execute different services on the datacenter configured for the tenant. The multi-tenant system may implement different mechanisms for release and deployment of software for each tenant. A tenant may further obtain or develop versions of software that include instructions for various services executing in a datacenter. Embodiments allow the tenant to deploy specific versions of software releases for different services running on different computing resources of the datacenter.

The computing resources of a data center are secure and may not be accessed by users that are not authorized to access them. For example, a data center 125a that is created for users of tenant 115a may not be accessed by users of tenant 115b unless access is explicitly granted. Similarly, data center 125b that is created for users of tenant 115b may not be accessed by users of tenant 115a, unless access is explicitly granted. Furthermore, services provided by a data center may be accessed by computing systems outside the data center, only if access is granted to the computing systems in accordance with the declarative specification of the data center.

With the multi-tenant system 110, data for multiple tenants may be stored in the same physical database. However, the database is configured so that data of one tenant is kept logically separate from that of other tenants so that one tenant does not have access to another tenant's data, unless such data is expressly shared. It is transparent to tenants that their data may be stored in a table that is shared with data of other customers. A database table may store rows for a plurality of tenants. Accordingly, in a multi-tenant system, various elements of hardware and software of the system may be shared by one or more tenants. For example, the multi-tenant system 110 may execute an application server that simultaneously processes requests for a number of tenants. However, the multi-tenant system enforces tenant-level data isolation to ensure that jobs of one tenant do not access data of other tenants.

Examples of cloud platforms include AWS (AMAZON web services), GOOGLE cloud platform, or MICROSOFT AZURE. A cloud platform 120 offers computing infrastructure services that may be used on demand by a tenant 115 or by any computing system external to the cloud platform 120. Examples of the computing infrastructure services offered by a cloud platform include servers, storage, databases, networking, security, load balancing, software, analytics, intelligence, and other infrastructure service functionalities. These infrastructure services may be used by a tenant 115 to build, deploy, and manage applications in a scalable and secure manner.

The multi-tenant system 110 may include a tenant data store that stores data for various tenants of the multi-tenant store. The tenant data store may store data for different tenants in separate physical structures, for example, separate database tables or separate databases. Alternatively, the tenant data store may store data of multiple tenants in a shared structure. For example, user accounts for all tenants may share the same database table. However, the multi-tenant system stores additional information to logically separate data of different tenants.

Each component shown in FIG. 1 represents one or more computing devices. A computing device can be a conventional computer system executing, for example, a Microsoft™ Windows™-compatible operating system (OS), Apple™ OS X, and/or a Linux distribution. A computing device can also be a client device having computer functionality, such as a personal digital assistant (PDA), mobile telephone, video game system, etc. Each computing device stores software modules storing instructions.

The interactions between the various components of the system environment 100 are typically performed via a network, not shown in FIG. 1. In one embodiment, the network uses standard communications technologies and/or protocols. In another embodiment, the entities can use custom and/or dedicated data communications technologies instead of, or in addition to, the ones described above.

Although the techniques disclosed herein are described in the context of a multi-tenant system, the techniques can be implemented using other systems that may not be multi-tenant systems. For example, an online system used by a single organization or enterprise may use the techniques disclosed herein to create one or more data centers on one or more cloud platforms 120.

System Architecture

Figure 2A:
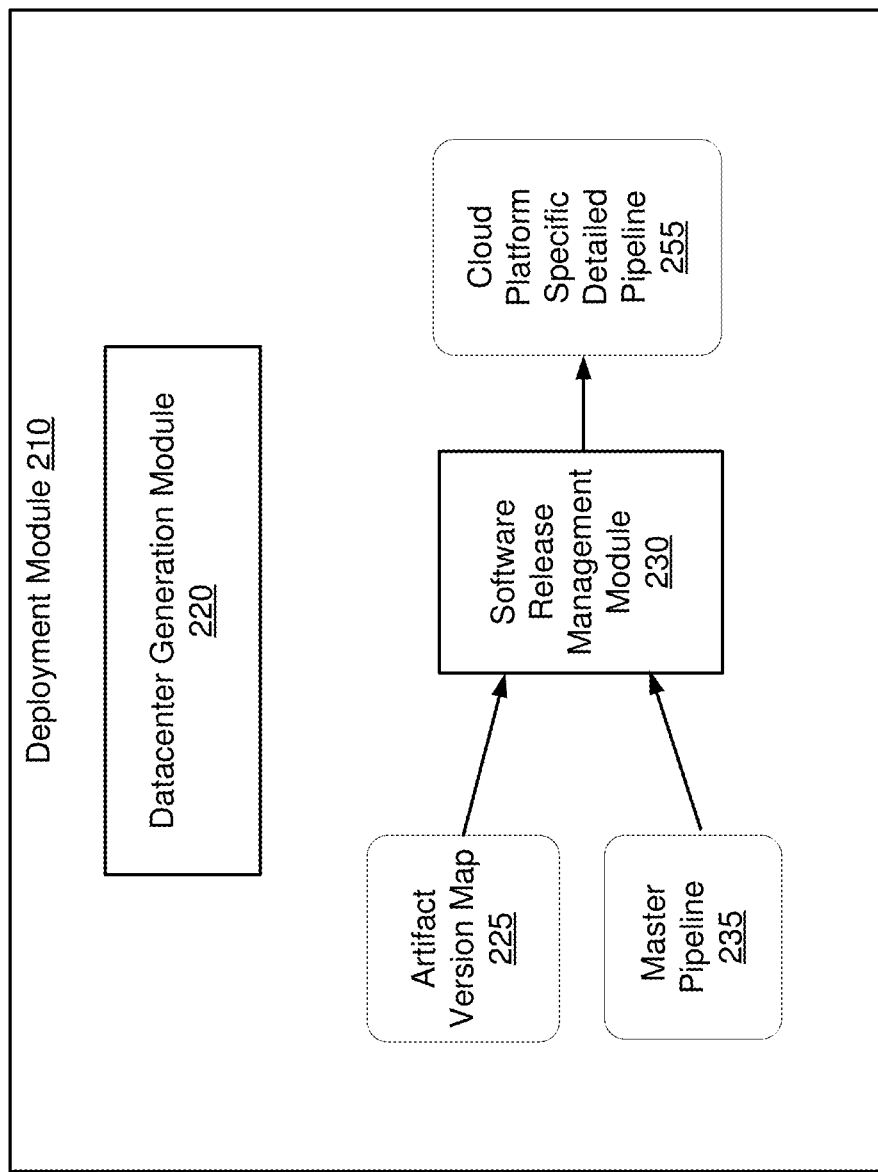
FIG. 2A is a block diagram illustrating the system architecture of a deployment module 210 according to an embodiment.

The multi-tenant system 110 includes a deployment module for deploying software artifacts on the cloud platforms. The deployment module can perform various operations associated with software releases, for example, provisioning resources on a cloud platform, deploying software releases, performing rollbacks of software artifacts installed on datacenter entities, and so on. FIG. 2 is a block diagram illustrating the system architecture of a deployment module 210 according to an embodiment. The deployment module 210 includes a data center generation module 220 and a software release management module 230. Other embodiments can have different and/or other components than the ones described here, and that the functionalities can be distributed among the components in a different manner.

The data center generation module 220 includes instructions for creating datacenters on the cloud platform. The software release management module 230 includes instructions for deploying software releases or software artifacts for various services or applications running on the datacenters created by the data center generation module 220.

Figure 4:
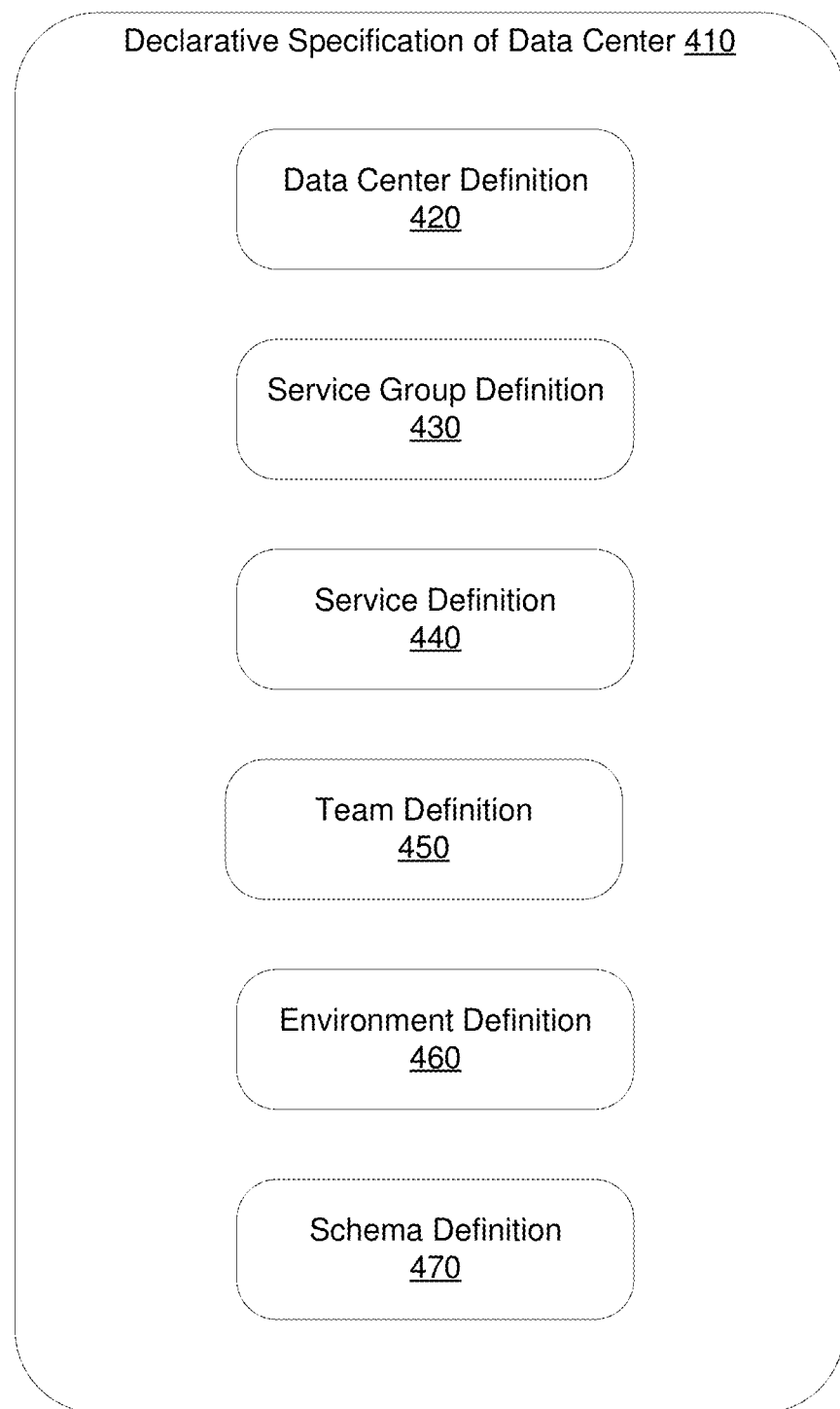
FIG. 4 illustrates an example of a data center declarative specification according to one embodiment.

The data center generation module 220 receives from users, for example, users of a tenant, a cloud platform independent declarative specification of a data center. The cloud platform independent declarative specification of a data center specifies various entities of the data center. In an embodiment, the cloud platform independent declarative specification of a data center comprises a hierarchical organization of datacenter entities, where each datacenter entity may comprise one or more services, one or more other datacenter entities or a combination of both. FIG. 4 describes various types of datacenter entities in further detail. The data center generation module 220 receives the platform independent declarative specification and a target cloud platform as input and generates a cloud platform specific metadata representation for the target cloud platform. The data center generation module 220 deploys the generated cloud platform specific metadata representation on the target cloud platform to create a data center on the target cloud platform according to the declarative specification.

The software release management module 230 receives as inputs (1) an artifact version map 225 and (2) a master pipeline 235. The artifact version map 225 identifies specific versions of software releases or deployment artifacts that are targeted for deployment on specific datacenter entities. The artifact version map 225 maps datacenter entities to software release versions that are targeted to be deployed on the datacenter entities. The master pipeline 235 includes instructions for operations related to software releases on the datacenter, for example, deployment of services, destroying services, provisioning resources for services, destroying resources for services, and so on.

The master pipeline 235 may include instructions for performing operations related to software releases for different environments such as development environment, test environment, canary environment, and production environment, and instructions for determining when a software release is promoted from one environment to another environment. For example, if the deployments of a software release in a development environment execute more than a threshold number of test cases, the software release is promoted for test environment for further testing, for example, system level and integration testing. If the software release in a test environment passes a threshold of test coverage, the software release is promoted to canary environment where the software release is provided to a small subset of users on a trial basis. If the software release in a canary environment executes without errors for a threshold time, the software release is promoted to production environment where the software release is provided to all users.

The software release management module 230 compiles the input artifact version map 225 and the master pipeline 235 to generate a cloud platform specific detailed pipeline 255 that is transmitted to the target cloud platform. The cloud platform specific detailed pipeline 255 includes instructions for deploying the appropriate version of a software release or deployment artifact on the datacenter entities as specified in the artifact version map 225. The software release management module 230 may receive modifications to one of the inputs. For example, a user may modify the input artifact version map 225 and provide the same master pipeline 235. Accordingly, the same master pipeline is being used but different software releases are being deployed on datacenter entities. The software release management module 230 recompiles the inputs to generate a new cloud platform specific detailed pipeline 255 that deploys the versions of software releases according to the new artifact version map 225.

The artifact version map may also be referred to as a deployment manifest, a version manifest, a software release map, or a software artifact version map. The master pipeline may also be referred to as a master deployment pipeline or a master orchestration pipeline.

Figure 2B:
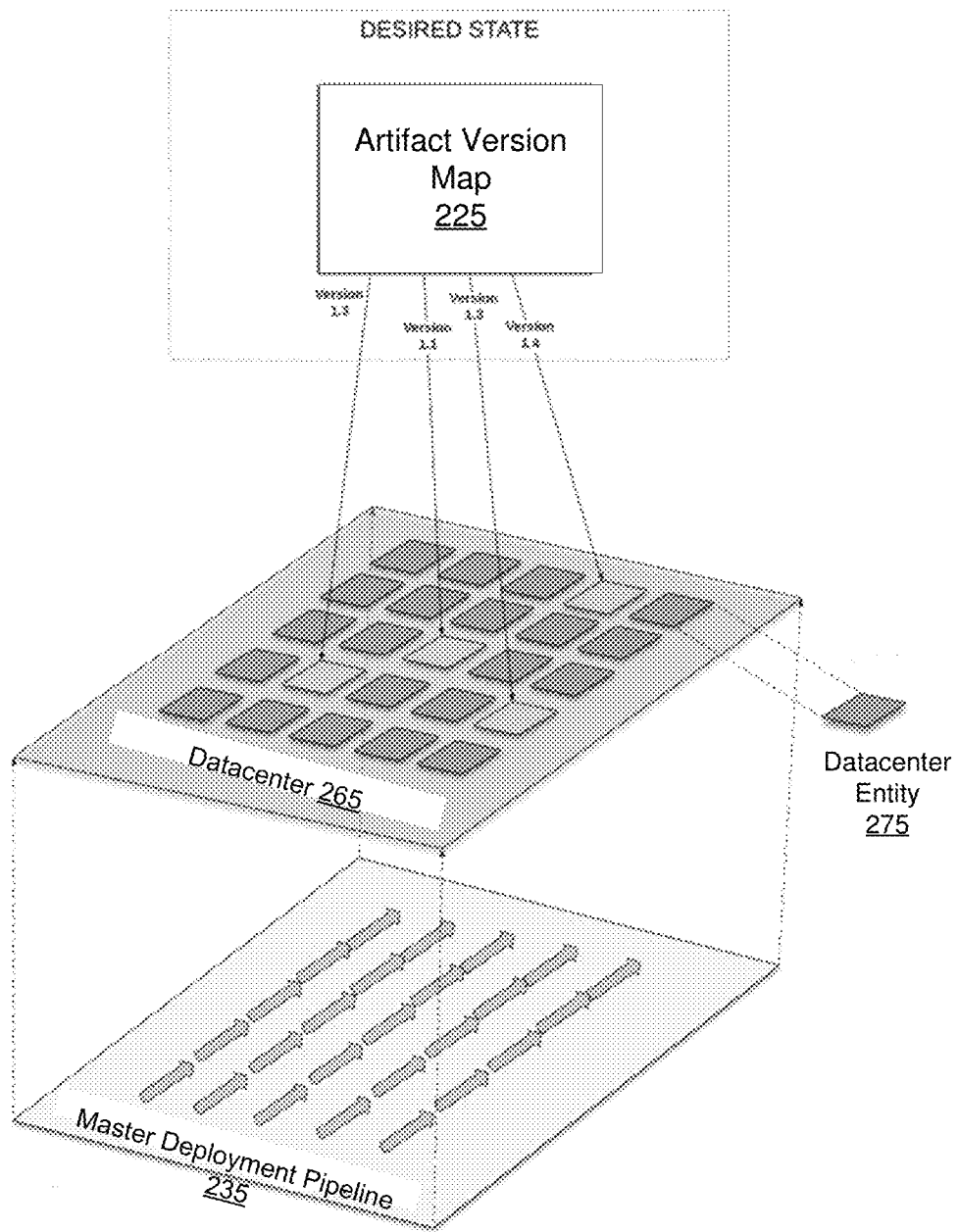
FIG. 2B illustrates the overall process for deploying software artifacts in a datacenter according to an embodiment.

FIG. 2B illustrates the overall process for deploying software artifacts in a datacenter according to an embodiment. FIG. 2B shows a layout of a datacenter 265 including various datacenter entities. As shown in FIG. 2B, the artifact version map 225 identifies the different versions of software that are targeted for release on different datacenter entities 275 of the datacenter 265. The master pipeline represents the flow of deployment artifacts through the various environments of the datacenter. The software release management module 230 combines the information in the master pipeline 235 with the artifact version map 225 to determine cloud platform specific detailed pipeline 255 that maps the appropriate version of software artifacts on the datacenter entities according to the artifact version map 225.

System Architecture

Figure 3:
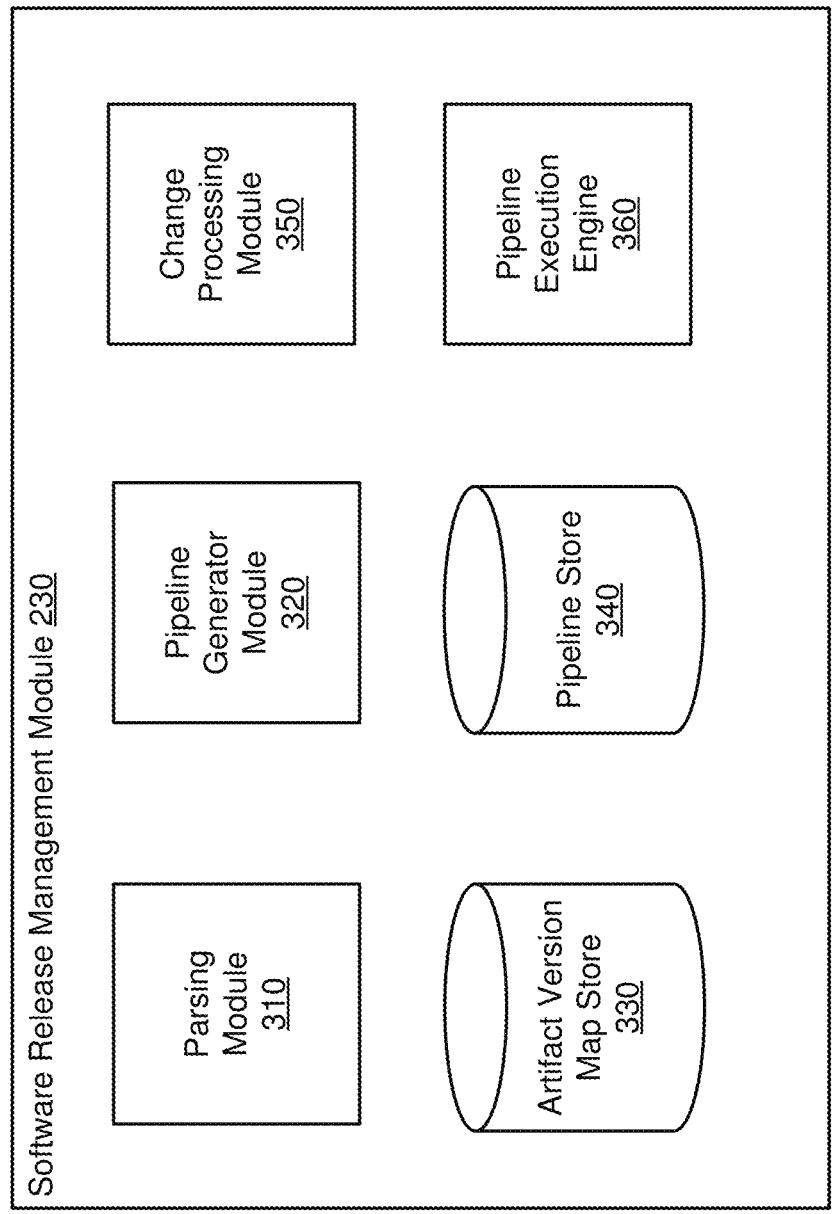
FIG. 3 is a block diagram illustrating the architecture of a software release management module 230 according to one embodiment.

FIG. 3 is a block diagram illustrating the architecture of a software release management module 230 according to one embodiment. The software release management module 230 includes a parsing module 310, a pipeline generator module 320, an artifact version map store 330, a pipeline store 340, a change processing module 350, and a pipeline execution engine 360. Other embodiments may include more, fewer, or different modules than those indicated herein in FIG. 3.

The parsing module 310 parses various types of user input including declarative specification of a data center, artifact version map 225, and master pipelines 235. The parsing module 310 generates data structures and metadata representations of the input processed and provides the generated data structures and metadata representations to other modules of the software release management module 230 for further processing.

The metadata store 340 stores various transformed metadata representations of data centers that are generated by the software release management module 230. The transformed metadata representations may be used for performing rollback to a previous version if an issue is encountered in a current version of the data center. The transformed metadata representations may be used for validation, auditing, governance, and so on at various stages of the transformation process.

The pipeline generator module 320 processes the master pipelines in conjunction with the artifact version map received as input to generate a detailed pipeline for a target cloud platform. The pipelines comprise stages that include instructions for provisioning services or deploying applications for deploying versions of software releases for various services on the cloud platform according to the artifact version map. The artifact version map store 330 stores artifact version maps received from users and the pipeline store 340 stores master pipelines as well as pipelines generated by the pipeline generator module 320.

The change processing module 350 identifies requests for changes made to services installed in a datacenter and tracks information describing the changes. The change processing module 350 interacts with a change management system and records details of execution of pipelines implementing the change in the services. The details recorded can be used for auditing, for example, to determine why certain change in the configuration of services of the datacenter was made.

The pipeline execution engine 360 executes the detailed pipelines generated by the pipeline generator module 320. In an embodiment, the pipeline execution engine 360 is a system such as SPINNAKER that executes pipelines for releasing/deploying software. The pipeline execution engine 360 parses the pipelines and executes each stage of the pipeline on a target cloud computing platform. The pipeline execution engine 360 may execute on a computing system of the cloud platform on which the datacenter is configured.

Cloud Platform-Based Data Center Generation

FIG. 4 illustrates an example of a declarative specification of a data center according to one embodiment. The declarative specification 410 includes multiple data center entities. A data center entity is an instance of a data center entity type and there can be multiple instances of each data center entity type. Examples of data center entities include data centers, service groups, services, teams, environments, and schemas.

The declarative specification 410 includes definitions of various types of data center entities including service group, service, team, environment, and schema. The declarative specification includes one or more instances of data centers. Following is a description of various types of data center entities and their examples. The examples are illustrative and show some of the attributes of the data center entities. Other embodiments may include different attributes and an attribute with the same functionality may be given a different name than that indicated herein. In an embodiment, the declarative specification is specified using hierarchical objects, for example, JSON (Javascript object notation) that conform to a predefined schema.

A service group 520 represents a set of capabilities and features and services offered by one or more computing systems that can be built and delivered independently, in accordance with one embodiment. A service group may be also referred to as a logical service group, a functional unit, or a bounded context. A service group 520 may also be viewed a set of services of a set of cohesive technical use-case functionalities offered by one or more computing systems. A service group 520 enforces security boundaries. A service group 520 defines a scope for modifications. Thus, any modifications to an entity, such as a capability, feature, or service offered by one or more computing systems within a service group 520 may propagate as needed or suitable to entities within the service group, but does not propagate to an entity residing outside the bounded definition of the service group 520. A data center may include multiple service groups 520. A service group definition specifies attributes including a name, description, an identifier, schema version, and a set of service instances. An example of a service group is a blockchain service group that includes a set of services used to providing blockchain functionality. Similarly, a security service group provides security features. A user interface service group provides functionality of specific user interface features. A shared document service group provides functionality of sharing documents across users. Similarly, there can be several other service groups.

Service groups support reusability of specification so that tenants or users interested in developing a data center have a library of service groups that they can readily use. The boundaries around services of a service groups are based on security concerns and network concerns among others. A service group is associated with protocols for performing interactions with the service group. In an embodiment, a service group provides a collection of APIs (application programming interfaces) and services that implement those APIs. Furthermore, service groups are substrate independent. A service group provides a blast radius scope for the services within the service group so that any failure of a service within the service group has impact limited to services within the service group and has minimal impact outside the service group.

Following is an example of a specification of a service group. The service group specifies various attributes representing metadata of the service group and includes a set of services within the service group. There may be other types of metadata specified for a service group, not indicated herein.

```
{
  "service_group": [
    {
      "cells": [ ],
      "description": "Service group Service Instance Definitions",
      "service_group_id": "id1",
      "name": "name1",
      "schema_version": "1.0",
      "cluster_instances": [
        {
          "cluster_instance_name": "cluster1",
          "cluster_type": "cluster_type1"
        },
        {
          "cluster_instance_name": " cluster2",
          "cluster_type": " cluster_type1"
        },
        {
          "cluster_instance_name": " cluster3",
          "cluster_type": " cluster_type2"
        }
      ],
      "service_instances": [
        {
          "service_instance_name": "serviceinstance0001",
          "service_type": "servicetype1"
        },
        {
          "service_instance_name": "serviceinstance0002",
          "service_type": " servicetype1"
          "cluster_instance": "cluster1"
        },
        {
          "service_instance_name": "serviceinstance0003",
          "service_type": " servicetype2"
        },
        ...
      ],
      "service_teams": ["team1"],
      "type": "servicetype"
      "security_groups":[
        {
          "name":"group1",
          "policies":[
            {
              "description":"Allow access from site S1",
              "destination":{ "groups":[ "group2" ] },
              "environments":[ "dev", "test", "staging" ],
              "source":{
                "iplist":"URL1",
                "filters":[ filter-expression ]
              }
            }
          ]
        }
      ]
    }
  ]
}
```

As shown in the example above, a service group may specify a set of clusters. A cluster represents a set of computing nodes, for example, a set of servers, a set of virtual machines, or a set of containers (such as KUBERNETES containers). A physical server may run multiple containers, where each container has its own share of filesystem, CPU, memory, process space, and so on.

The service group specifies a set of services. A service group may specify a cluster for a service so that the data center deployed on a cloud platform runs clusters of computing nodes and maps the services to clusters based on the specified mapping if included in the declarative specification. For example, in the service group example shown above, the service instance serviceinstance0002 is specified to run on cluster instance cluster1.

The service group may specify security groups, each security group specifying a set of services that are allowed to interact with each other. Services outside the security group are required to pass additional authentication to communicate with services within the security group. Alternatively, the services within a security group use one protocol to interact with each other and services outside the security group use a different protocol that requires enhances authentication to interact with services within the security group. Accordingly, a security group specifies policies that determine how services can interact with each other. A security policy may specify one or more environments for which the security policy is applicable. For example, a security policy policy1 may apply to a particular environment env1 (e.g., production environment) and another security policy policy2 may apply to another environment env2 (e.g., development environment). A security policy may be specified for a service group type or for a specific service type.

In an embodiment, the security policy specifies expressions for filtering the service groups based on various attributes so that the security policy is applicable to the filtered set of service groups. For example, the security policy may specify a list of IP (internet protocol) addresses that are white listed for a set of service groups identified by the filtered set and accordingly these computing systems are allowed access to the service group or to specific set of services within the service group.

In an embodiment, a security policy may specify for a service group, a set of source services and a set of destination services. The source services for a particular service specify the services outside the security group that are allowed to connect with this particular service. The destination services for a particular service specify the services outside the security group that this particular service needs to connect to. During provisioning and deployment, the data center generation module generates instructions for the cloud platform that implement specific network policies using cloud platform specific features and network functionality such that the network policies implement the security policies specified in the declarative specification.

A data center entity called a cell represents a set of services that interact with each other in a vertical fashion and can be scaled by additional instances or copies of the cell, i.e., copies of the set of services. Creating multiple instances of a cell allows a system to scale a set of services that interact with each other. A data center instance may include one or more cells. Each cell may include one or more services. A data center may include instances of service groups or cells.

A service definition specifies metadata for a type of service, for example, database service, load balancer service, and so on. The metadata be describe various attributes of a service including a name of the service, description of the service, location of documentation for the service, any sub-services associated with the service, an owner for the service, a team associated with the service, build dependencies for the service specifying other services on which this service depends at build time, start dependencies of the service specifying the other services that should be running when this particular service is started, authorized clients, DNS (domain name server) name associated with the service, a service status, a support level for the service, and so on. The service definition specifies a listening ports attribute specifying the ports that the service can listen on for different communication protocols, for example, the service may listen on a port p1 for UDP protocol and a port p2 for TCP protocol. Other services within the data center can interact with a service via the ports specified by the service.

The service definition specifies an attribute outbound access that specifies destination endpoints, for example, external URLs (uniform resource locators) specifying that the service needs access to the specified external URLs. During deployment, the data center generation module ensures that the cloud platform implements access policies such that instances of this service type are provided with the requested access to the external URLs.

The outbound access specification may identify one or more environment types for the service for which the outbound access is applicable. For example, an outbound access for a set of endpoints S1 may apply to a particular environment env1 (e.g., production environment) and outbound access for a set of endpoints S2 may apply to another environment env2 (e.g., development environment).

Following is an example of a service definition.

```
{
  "service_definition": [
    {
      "authorized_clients": [ ],
      "build_dependencies": [ ],
      "description": "description of service",
      "dns_name": "dns1",
      "documentation": "URL",
      "name": "name1",
      "namespace": "space1",
      "service_owner": "user1",
      "service_status": "GA",
      "service_team": "team1",
      "support_level": "STANDARD",
      "start_dependencies": ["svc5", "svc7", ...],
      "sub_services": [ "service1", " service2", " service3", ... ],
      "listening_ports":[
            { "protocol":"tcp", "ports":[ "53" ] },
            { "protocol":"udp","ports":[ "53" ] }
         "outbound_access":[
            {
              "destination":[
                {
                  "endpoints":[ ".xyz.com:443", ".pqr.com:443" ]
                }
              ]
            }
         ],
       }
    ]
}
```

A team definition 450 includes team member names and other attributes of a team for example, name, email, communication channel and so on. Following is an example of a team definition. A service may be associated with one or more teams that are responsible to modifications made to that service. Accordingly, any modification made to that service is approved by the team. A service may be associated with a team responsible for maintenance of the service after it is deployed in a cloud platform. A team may be associated with a service group and is correspondingly associated with all services of that service group. For example, the team approves any changes to the service group, for example, services that are part of the service group. A team may be associated with a data center and is accordingly associated with all service groups within the data center. A team association specified at a data center level provides a default team for all the service groups within the data center and further provides a default team for all services within the service groups.

According to an embodiment, a team association specified at the functional level overrides the team association provided at the data center level. Similarly, a team association specified at the service level overrides the default that may have been provided by a team association specified at the service group level or a data center level. A team can decide how certain action is taken for the data center entity associated with the team. The team associations also determine the number of accounts on the cloud platform that are created for generating the final metadata representation of the data center for a cloud platform by the compiler and for provisioning and deploying the data center on a cloud platform. The data center generation module 210 creates one or more user accounts in the cloud platform and provides access to the team members to the user accounts. Accordingly, the team members are allowed to perform specific actions associated with the data center entity associated with the team, for example, making or approving structural changes to the data center entity or maintenance of the data center entity when it is deployed including debugging and testing issues that may be identified for the data center entity.

Conventional techniques associate the same team with the data center through out the design process thereby resulting in the organizational structure having an impact on the design of the data center or service group. Embodiments decouple the team definition from the constructions that define the data center entity, thereby reducing the impact of the teams on the design and architecture of the data center entity.

```
{
  "team_definition": [
    {
      "name": "team1",
      "description": "description of team",
      "admins": [
        "user1",
        "user2",
        "user3",
        "user4",
        ...
      ],
      "team_id": "id1",
      "owner": "owner_id",
      "email": "team1@xyz.com",
    }
  ],
  "communication_channel": "channel1"
  "schema_version": "1.0"
}
```

An environment definition 460 specifies a type of system environment represented by the data center, for example, development environment, staging environment, test environment, or production environment. A schema definition 470 specifies schema that specifies syntax of specific data center entity definitions. The schema definition 470 is used for validating various data center entity definitions. The data center generation module determines security policies for the data center in the cloud platform specific metadata representation based on the environment. For example, a particular set of security policies may be applicable for an environment env1 and a different set of security policies may be applicable for environment env2. For example, the security policies provide much more restricted access in production environment as compared to development environment. The security policy may specify the length of time that a security token is allowed to exist for specific purposes. For example, long access tokens (e.g., week long access tokens) may be allowed in development environment but access tokens with much smaller life time (e.g., few hours) used in production environment. Access tokens may allow users or services with access to specific cloud platform resources.

A data center definition 420 specifies the attributes and components of a data center instance. A declarative specification may specify multiple data center instances. The data center definition 420 specifies attributes including a name, description, a type of environment, a set of service groups, teams, domain name servers for the data center, and so on. A data center definition may specify a schema definition and any metadata representation generated from the data center definition is validated against the specified schema definition. A data center includes a set of core services and capabilities that enable other services to function within the data center. An instance of a data center is deployed in a particular cloud platform and may be associated with a particular environment type, for example, development, testing, staging, production, and so on.

Following is a definition of a data center instance. The data center instance definition includes a list of service groups included in the data center instance and other attributes including an environment of the data center, a data center identifier, a name, a region representing a geographical region, one or more teams associated with the data center, and a schema version.

```
{
  "datacenter_instance": {
    "environment": "env1",
    "datacenter_instance_identifier": "id1",
    "name": "data_center1",
    "region": "region1",
    "service_groups": [
      "service_group 1",
      "service_group2",
      "service_group3",
      "service_group4",
      ...
    ],
    "schema_version": "1.0",
    "admin_team":"admins",
    ...
  }
}
```

Figure 5:
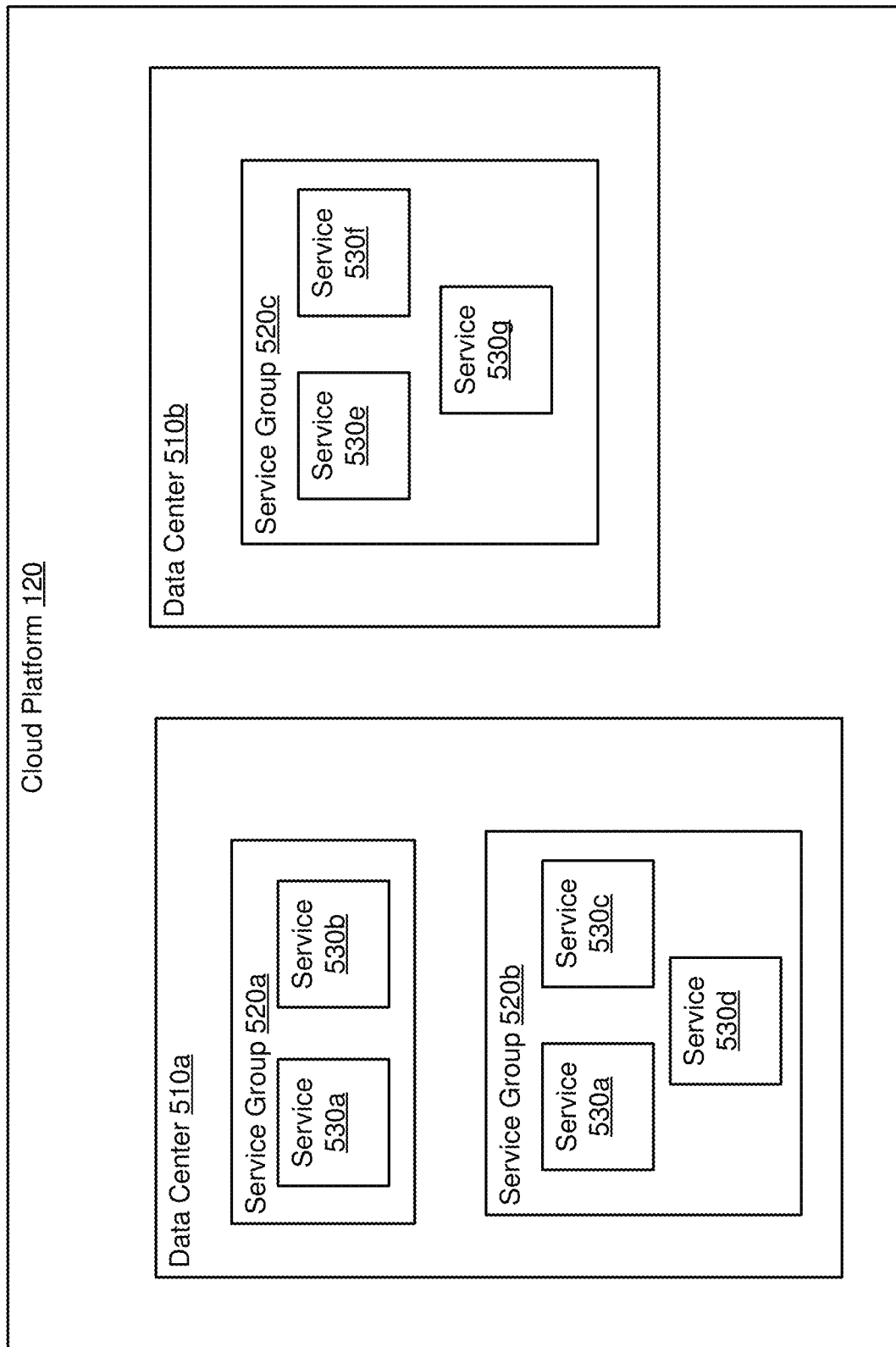
FIG. 5 illustrates example data centers created on a cloud platform based on a declarative specification according to one embodiment.

FIG. 5 illustrates some example data centers created on a cloud platform based on a declarative specification according to one embodiment. The data centers 510 may be created based on a declarative specification processed by the data center generation module 210. As shown in FIG. 5, multiple data centers may be configured within a cloud platform 120. Each data center 510 may correspond to a tenant 115 of a multi-tenant system 110. A tenant 115 may create one or more data centers 510. Alternatively, a data center 510 may be created by any computing system. Each data center includes one or more service groups. For example, data center 510*a* includes service groups 520*a* and 520*b* and data center 510*b* includes service group 520*c*. A data center may include multiple instances of a particular type of service group. Each service group includes a set of services. For example, service group 520*a* includes services 530*a* and 530*b*, service group 520*b* includes services 530*a*, 530*b*, and 530*c*, and service group 520*c* includes services 530*e*, 530*f*, and 530*g*. A service group may include multiple instances of services of the same service type.

The datacenter generation module 220 creates data centers on cloud platforms based on a declarative specification using the following steps. The data center generation module 210 receives a cloud platform independent declarative specification of a data center. The cloud platform independent declarative specification may be for a tenant of the multi-tenant system or for any other computing system, for example, an online system. The cloud platform independent declarative specification is specified using the cloud platform infrastructure language. The cloud platform independent declarative specification of the data center is configured to generate the data center on any of a plurality of cloud platforms.

The data center generation module 210 receives information identifying a target cloud platform for creating the data center based on the cloud platform independent declarative specification. The target cloud platform could be any of a plurality of cloud platforms, for example, AWS, AZURE, GCP, and so on. The data center generation module 210 further receives information to connect with the target cloud platform, for example, credentials for creating a connection with the target cloud platform. A cloud platform may also be referred to as a cloud computing platform.

The data center generation module 210 compiles the cloud platform independent declarative specification to generate a cloud platform specific data center representation for creating the data center on the target cloud computing platform. For example, the cloud platform specific data center representation may refer to user accounts, network addresses, and so on that are specific to the target cloud computing platform.

The data center generation module 210 sends the platform specific data center representation along with instructions for deploying the data center on the target cloud computing platform. The target cloud computing platform executes the instructions to configure the computing resources of the target cloud computing platform to generate the data center according to the platform specific data center representation. The data center generation module 210 provides users with access to the computing resources of the data center configured by the cloud computing platform. For example, if the data center was created for a tenant of the multi-tenant system, users associated with the tenant are provided with access to the data center.

Figure 6:
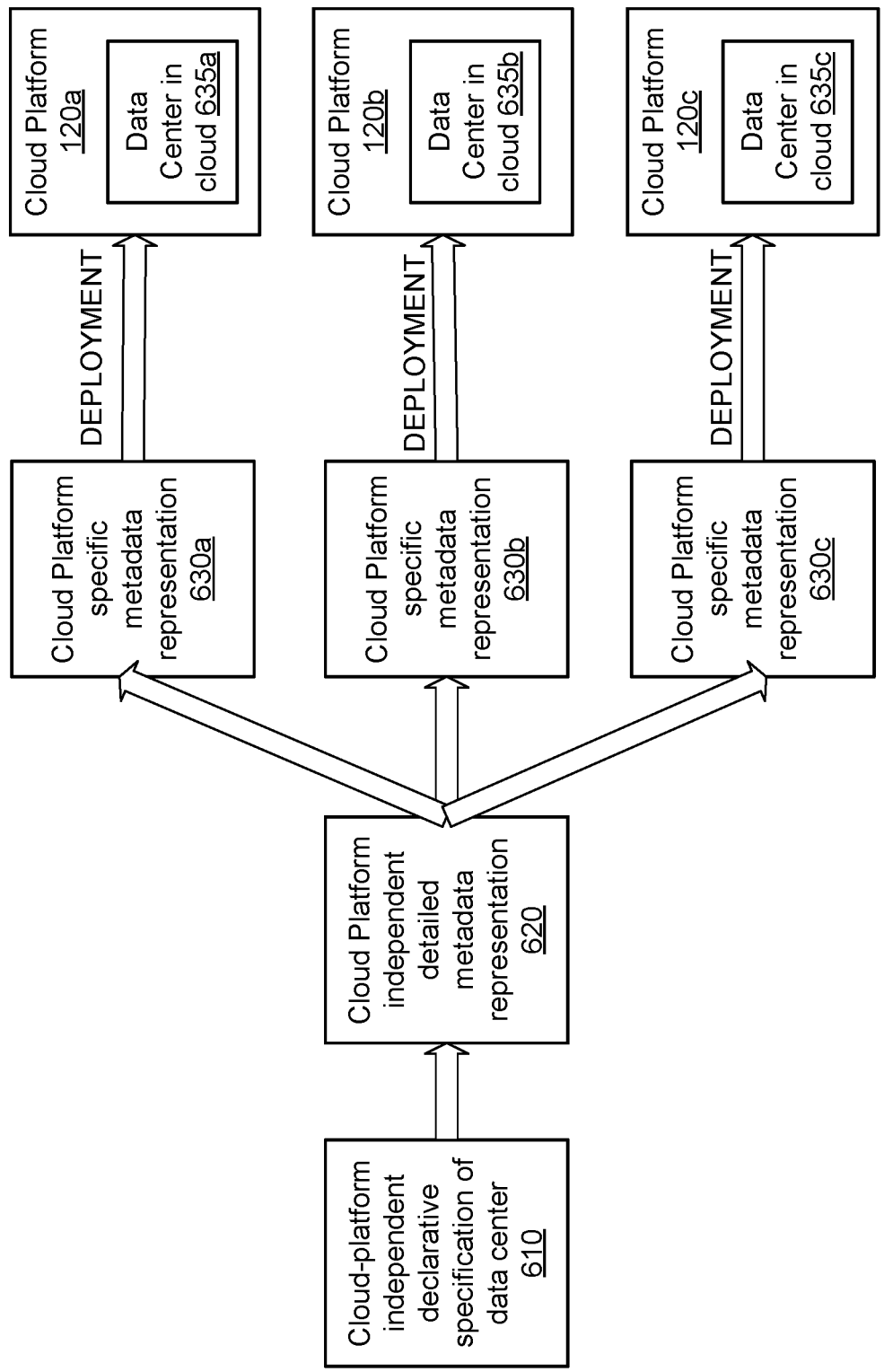
FIG. 6 is a block diagram illustrating generation of data centers on cloud platforms based on a declarative specification, according to one embodiment.

FIG. 6 is a block diagram illustrating generation of data centers on cloud platforms based on a declarative specification, according to one embodiment. The data center generation module 210 receives as input a cloud-platform independent declarative specification 610. The cloud-platform independent declarative specification 610 may be a version of the declarative specification that is being incrementally modified by users. The data center generation module 210 processes a particular version of the cloud-platform independent declarative specification 610. Since cloud-platform independent declarative specification 610 is not specified for any specific target cloud platform, the data center generation module 210 can configure a data center on any target cloud platform based on the cloud-platform independent declarative specification 610.

The data center generation module 210 processes the cloud-platform independent declarative specification 610 to generate a cloud-platform independent detailed metadata representation 620 for the data center. The cloud-platform independent detailed metadata representation 620 defines details of each instance of data center entity specified in the cloud-platform independent declarative specification 610. The data center generation module 210 creates unique identifiers for data center entity instances, for example, service instances.

In an embodiment, the cloud-platform independent detailed metadata representation 620 includes an array of instances of data center entity types, for example, an array of service group instances of a particular service group type. Each service group instance includes an array of service instances. A service instance may further include the details of a team of users that are allowed to perform certain actions associated with the service instance. The details of the team are used during provisioning and deployment by the data center generation module 210, for example, for creating a user account for the service instance and allowing members of the team to access the user account.

The cloud-platform independent detailed metadata representation 620 includes attributes of each instance of data center entity. Accordingly, the description of each instance of data center entity is expanded to include all details. As a result, the cloud-platform independent detailed metadata representation 620 of a data center may be significantly larger than the cloud-platform independent declarative specification 610. For example, the cloud-platform independent declarative specification 610 may be few thousand lines of specification, whereas the cloud-platform independent detailed data center representation 620 may be millions of lines of generated code. As a result, the data center generation module 210 keeps the cloud-platform independent detailed metadata representation 620 as immutable, i.e., once the representation is finalized, no modifications are performed to the representation. For example, if any updates, deletes, or additions of data center entities need to be performed, they are performed on the cloud platform independent declarative specification 610.

The data center generation module 210 receives a target cloud platform on which the data center is expected to be provisioned and deployed and generates a cloud platform specific detailed metadata representation 630 of the data center. For example, the data center generation module 210 interacts with the target cloud platform to generate certain entities (or resources), for example, user accounts, virtual private clouds (VPCs), and networking resources such as subnets on the VPCs, various connections between entities in the cloud platform, and so on. The data center generation module 210 receives resource identifiers of resources that are created in the target cloud platform, for example, user account names, VPC IDs, and so on, and incorporates these in the cloud-platform independent detailed metadata representation 620 to obtain the cloud platform specific metadata representation 630 of the data center. In an embodiment, the data center generation module 210 creates one unique user account on the cloud platform for each team for a given combination of a service group and a service. The user account is used by the team for performing interactions with that particular service for that service group, for example, for debugging, for receiving alerts, and so on.

The target cloud platform may perform several steps to process the cloud-platform specific detailed metadata representation 630. For example, the cloud platform independent declarative specification may specify permitted interactions between services. These permitted interactions are specified in the cloud-platform specific detailed metadata representation 630 and implemented as network policies of the cloud platform. The cloud platform may further create security groups to implement network strategies to implement the data center according to the declarative specification.

The cloud platform independent declarative specification specifies dependencies between services, for example, start dependencies for each service listing all services that should be running when a particular service is started. The data center generation module 220 generates the cloud platform specific detailed metadata representation of the data center that includes information describing these dependencies such that the instructions for deploying the service ensure that the cloud platform starts the services in an order specified by the dependencies such that for each service, the services required to be started before the service are running when the service is started. Accordingly, the dependencies between services represent a dependency graph and the cloud platform starts running the services in an order determined based on the dependency graph such that if service A depends on service B, the service B is started before service A is started.

The data center generation module 220 creates trust relationships between user accounts that allow services to access other services via secure communication channels. These trust relationships are generated using substrate specific instructions generated based on the declarative specification, for example, based on outbound access attributes specified for services. The data center generation module 220 sends instructions to the cloud platform to create network policies based on cloud platform specific mechanisms that control the interactions and access across service groups and services, for example, as specified by the constructs of the declarative specification such as outbound access, security groups, security policies and so on.

The data center generation module 210 deploys the cloud platform specific metadata representation 630 on the specific target cloud platform for which the representation was generated. The data center generation module 210 may perform various validations using the generated metadata representations, including policy validations, format validations, and so on.

The cloud platform independent declarative specification 610 may be referred to as a declared data center representation, cloud-platform independent detailed metadata representation 620 referred to as a derived metadata representation of the data center, and cloud platform specific metadata representation 630 referred to as a hydrated metadata representation of the data center.

Overall Process for Deployment of Software Artifacts on a Datacenter

Figure 7:
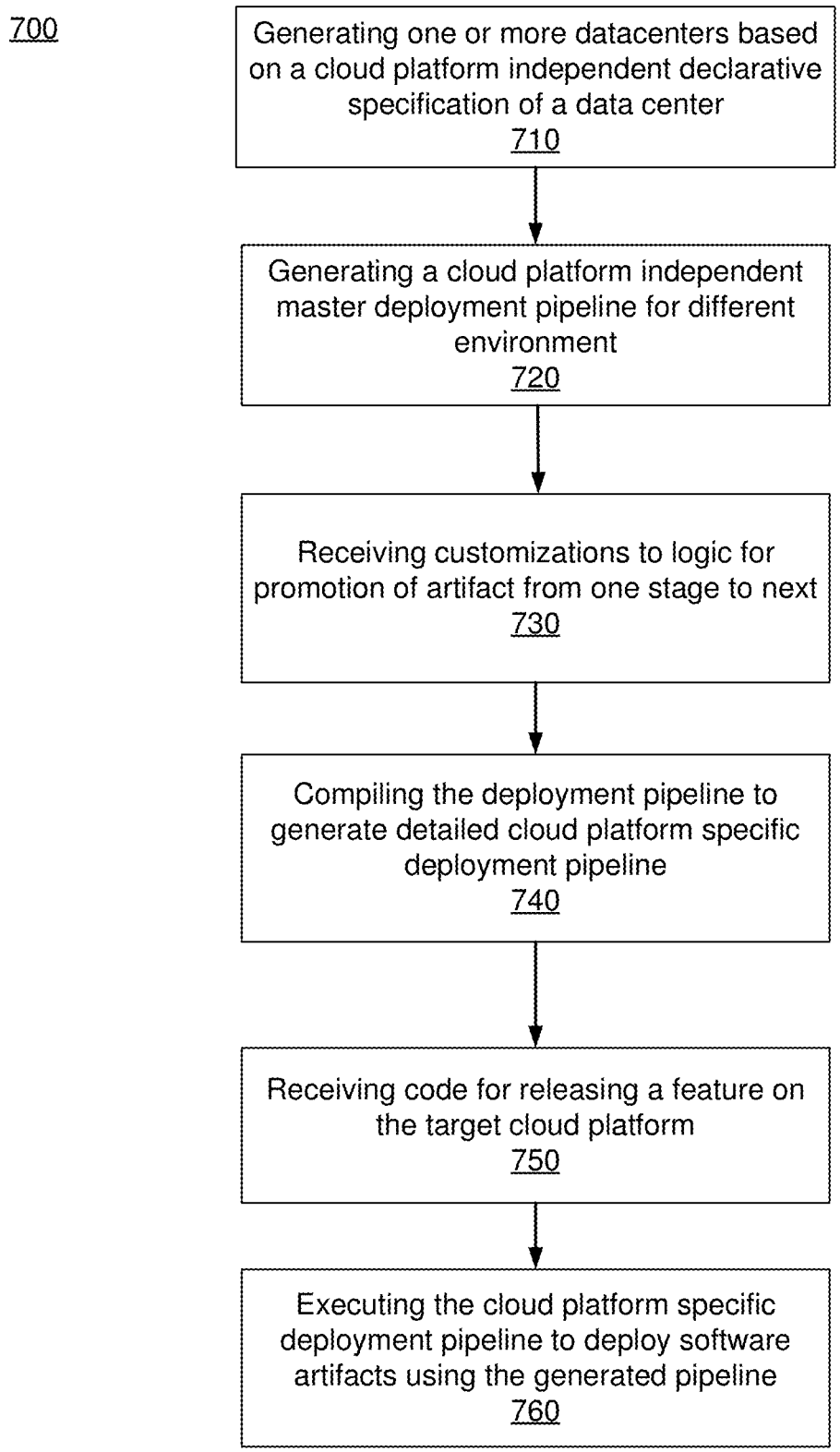
FIG. 7 shows the overall process for generating pipelines for deployment of software artifacts on datacenters configured on a cloud platform according to an embodiment.

FIG. 7 shows the overall process for generating pipelines for deployment of software artifacts on datacenters configured on a cloud platform according to an embodiment. The datacenter generation module generates 710 one or more datacenters on a target cloud platform. Each datacenter is generated from a cloud platform independent declarative specification and has a hierarchy of datacenter entities.

The software release management module 230 generates 720 a cloud platform independent master pipeline. In an embodiment, the cloud platform independent master pipeline includes stages corresponding to environments of the datacenters, for example, development environment, test environment, canary environment, and production environment. The master pipeline composes a sequence of progressive and/or conditional deployment across various environments such as development environment, test environment, staging environment, or production environment. The master pipeline may be triggered by delivery of the image for a software artifact and includes stages or instructions to deploy the build in environments of type development. The software artifact that is built is conditionally promoted to one or more test environments, followed by one or more canary environments before eventually getting deployed to production environments. The master pipeline may be customized by users, for example, service owners to represent a specific orchestration across environments. The master pipeline may be customized to capture specific promotion criteria for moving from one stage to next. For example, different tenants of the multi-tenant system may customize the master pipeline in a different manner. In an embodiment, the master pipeline by default uses the latest version of software for a software artifact for a service and builds and deploys the version across various environments. The user can use the artifact version map to ensure that a specific version of a software artifact is deployed on specific datacenter entities.

In an embodiment, each service deployed in the datacenter has a cloud platform independent master pipeline generated from the datacenter entities as defined by the declarative specification of the datacenter, for example, master pipeline for datacenter instances, master pipeline for service groups, master pipeline for cells, master pipeline for services, and so on. The master pipelines may be triggered on delivery of images of software artifacts. The master pipelines may implement a service owner-controlled continuous deployment. The master pipelines may implement datacenter instance owner-owned or release owner-owned on-demand deployment.

Certain portions of the master pipeline may be customized by the users, for example, by tenants of a multi-tenant system that are deploying services on a datacenter. For example, the promotion decision pipeline may be customized by a tenant to determine which test cases are executed and what threshold is The software release management module 230 receives 730 customizations to logic for promoting a software artifact from one stage to another stage of the cloud platform independent master pipeline.

The software release management module 230 compiles 740 the cloud platform independent master pipeline to generate a cloud platform specific detailed deployment pipeline that is specific to the hierarchy of datacenter entities of each datacenter as specified by the cloud platform independent declarative specification for the datacenter.

The software release management module 230 further receives 750 code for releasing one or more features of services deployed on the datacenter. The software release management module 230 executes 760 the cloud platform specific detailed deployment pipeline to deploy software artifacts based on the received code.

Figure 8:
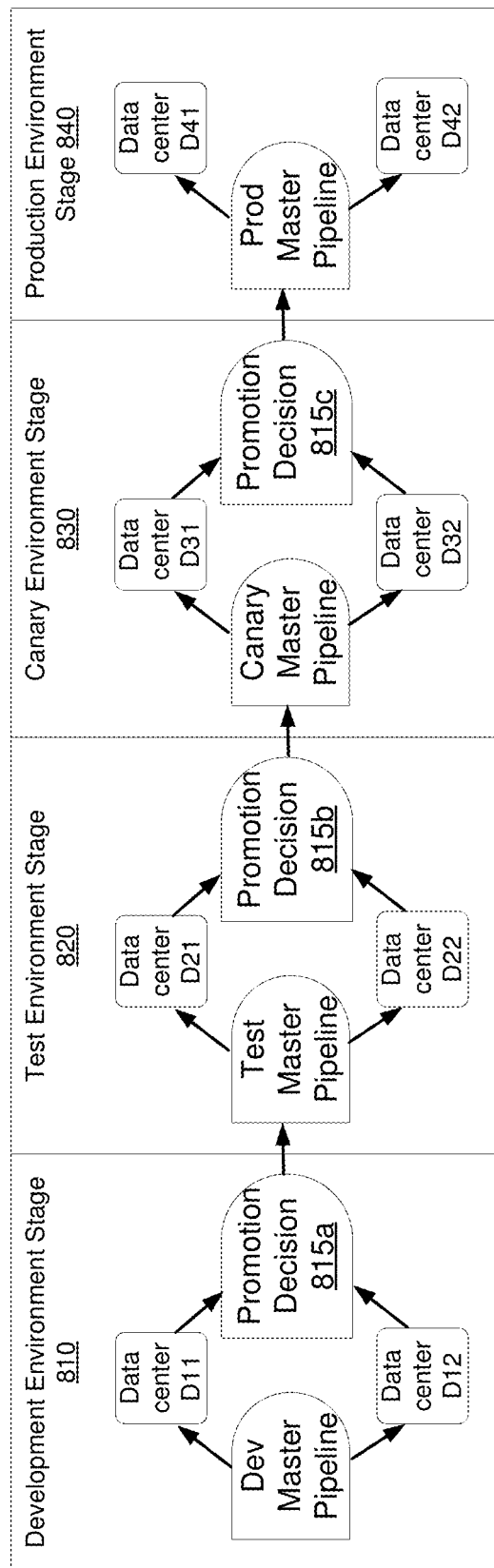
FIG. 8 illustrates an example master pipeline according to an embodiment.

FIG. 8 illustrates an example master pipeline 800 according to an embodiment. A master pipeline represents a sequence of stages that represent progressive conditional deployment across various datacenter environments. FIG. 8 shows stages for different environments of datacenter including development environment, test environment, canary environment, and production environment. Each stage further represents a pipeline that is executed for that stage. Accordingly, the master pipeline 800 includes a development environment pipeline 810 which feeds into a test environment pipeline 820, which feeds into a canary environment pipeline 830, which feeds into production environment pipeline 840.

The pipeline at each stage is a hierarchical pipeline comprising lower level pipelines. For example, the development environment pipeline 810 comprises a development master pipeline that feeds into datacenter pipelines D11, D12, . . . , depending on the number of datacenters specified as having development environment in the declarative specification of the datacenters.

The test environment pipeline 820 comprises a test master pipeline that feeds into datacenter pipelines D21, D22, . . . , depending on the number of datacenters specified as having test environment in the declarative specification of the datacenters.

The canary environment pipeline 820 comprises a canary master pipeline that feeds into datacenter pipelines D31, D32, . . . , depending on the number of datacenters specified as having canary environment in the declarative specification of the datacenters.

The production environment pipeline 820 comprises a production master pipeline that feeds into datacenter pipelines D21, D22, . . . , depending on the number of datacenters specified as having test environment in the declarative specification of the datacenters.

Each environment pipeline 810, 820, 830 includes a promotion decision pipeline 815*a*, 815*b*, 815*c* respectively. The outputs of the datacenter pipelines of the environment pipeline are collected by the promotion decision pipeline 815 that determines whether the software artifact is ready for promotion to the next stage. The promotion decision pipeline 815 may determine based on test case results obtained by the datacenters whether the software artifact for the service is promoted to the next stage. For example, if more than a threshold test cases are passed, the promotion decision pipeline 815 promotes the software artifact to the next stage. The last environment stage, for example, the production environment pipeline may not have a promotion decision pipeline since there is no subsequent stage to which the software artifact needs to be promoted. As shown in FIG. 8, the promotion decision pipeline 815*a* of development environment pipeline determines whether to promote the software artifact from development stage to test stage; the promotion decision pipeline 815*b* of test environment pipeline determines whether to promote the software artifact from test stage to canary stage, and the promotion decision pipeline 815*c* of canary environment pipeline determines whether to promote the software artifact from canary stage to production stage.

A master pipeline comprises multiple pipelines, for example, a provisioning pipeline for provisioning resources of the target cloud platform and a deployment pipeline for deploying a software artifact on a data center entity. Each pipeline comprises a sequence of stages, each stage representing one or more actions that need to be performed by the target cloud platform towards provisioning and deploying of the data center. The data center generation module 210 generates detailed pipelines for deploying versions of software artifacts on datacenter entities.

In an embodiment, the pipeline generator module 320 generates detailed pipelines using pipeline templates that include variables. A pipeline template is converted into a pipeline by providing specific values of the variables in the pipeline. The process of generating a pipeline from a template is referred to as hydration of the pipeline template. A pipeline template contains templating expressions used as placeholders for actual values used in the deployment. For example, a templating expression may be replaced by target specific parameter values or expressions. Multiple pipeline instances may be generated by hydrating the pipeline template for different targets. The template variables represent parameters that may be replaced with specific values for a given target to generate a pipeline instance specific to that target. For example, a template variable "account_id" may be replaced with an actual value of account_id, for example, "12345" during hydration.

In one embodiment, the pipeline generator module 320 generates pipelines in a hierarchical fashion based on the hierarchy of the data center entities of the data center. For example, the data center comprises data center entities of different types including data centers, service groups, services, and so on. A data center entity may include one or more child data center entities. For example, a data center includes one or more service groups as child data center entities. A service group includes one or more services as child data center entities. Accordingly, the data center generation module 210 starts at a data center entity at a level of the hierarchy and generates pipelines of data center entities below that level. For example, the pipeline generator module 320 starts at the data center level and generates pipelines for service groups within the data center. For each service group, the pipeline generator module 320 generates pipelines for services within the service group.

The process for executing pipelines according to one embodiment is as follows. The software release deployment module 230 receives a request to deploy a software artifact on a set of data center entities in the target cloud platform. The software release deployment module 230 executes the master pipeline for one or more datacenters. The software release deployment module 230 executes the aggregate pipelines for each service group of each datacenter. The aggregate pipeline comprises pipelines for services within the service group. For each service within each service group, the pipeline is executed by executing all the stages of the pipeline. The execution of the provisioning pipelines results in provisioning of the resource for a service and the deployment pipeline causes deployment of the service in the target cloud platform.

Figure 9:
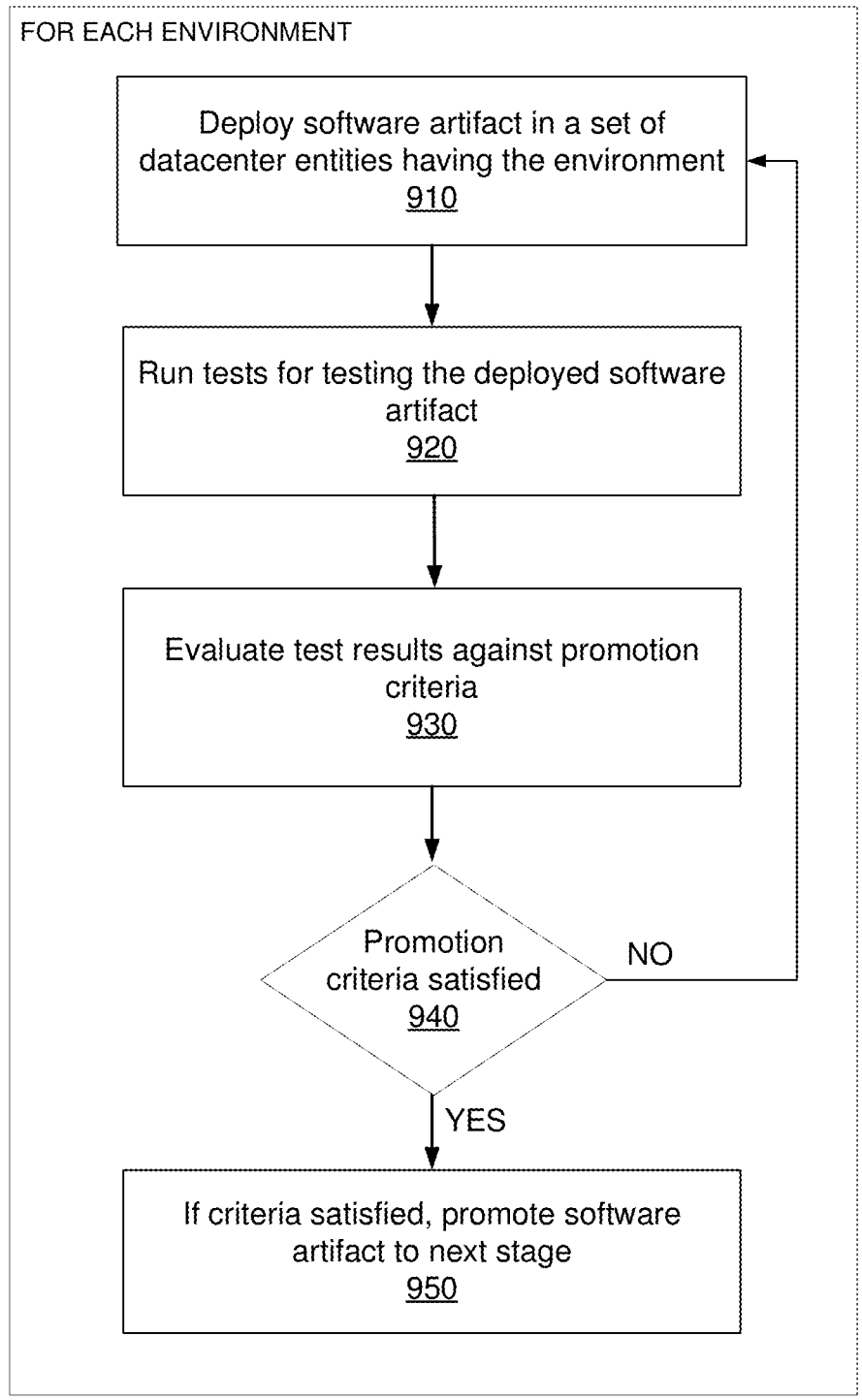
FIG. 9 shows the overall process executed by a stage for an environment of the master pipeline on a cloud platform according to an embodiment.

FIG. 9 shows the overall process executed by a stage for an environment of the master pipeline on a cloud platform according to an embodiment. The steps 910, 920, 930, 940, and 950 may be performed by each environment pipeline 810, 820, 830. The production environment pipeline 3 may execute only steps 910 and 920. The steps shown in FIG. 9 may be performed for one service or for multiple services specified using a manifest file.

The environment pipeline for an environment E includes instructions to deploy 910 the software on a set of datacenter entities, for example, a set of datacenter entities specified as having the environment E. In an embodiment, the software artifact is generated by compiling source code for a service. The source code may be obtained from a version control software. The set of datacenter entities may include datacenter instances, service groups, cells, services, or any combination of these.

The environment pipeline for the environment E further includes instructions for running 920 tests for testing the deployed software artifact on the set of datacenter entities. The environment pipeline for the environment E further includes instructions for evaluating 930 the test results against promotion criteria, for example, using the promotion decision pipeline 815. If the promotion criteria are not satisfied, the steps 910, 920, 930, and 940 may be repeated using a revised software artifact, for example, a software artifact generated from source code that includes fixes for certain defects identified during the testing 920. The environment pipeline for the environment E further includes instructions for proceeding 950 to the next stage if the promotion criteria are satisfied.

In an embodiment, the master pipeline comprises a hierarchy of pipelines. The hierarchy comprises multiple levels and pipelines at a particular level include pipelines of the next lower level as children pipelines. For example, at the highest level of hierarchy the master pipeline includes a release master pipeline that deploys a set of services related to a product. The next level of hierarchy includes service master pipelines that represent al deployments of a particular service across various environments. The next level of hierarchy may include service group master pipelines followed by service master pipelines.

Figure 10:
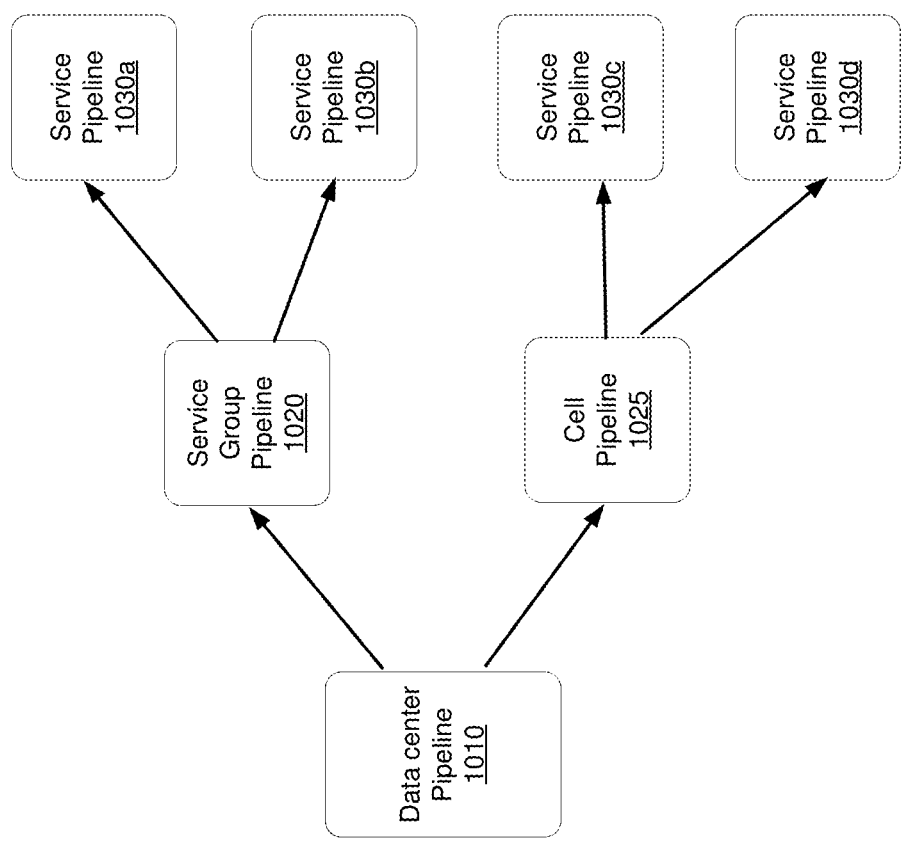
FIG. 10 shows an example master pipeline according to an embodiment.

FIG. 10 shows an example master pipeline according to an embodiment. The master pipeline is a hierarchical pipeline where each stage of a pipeline may comprise a pipeline with detailed instructions for executing the stage. The master pipeline hierarchy may mirror the datacenter hierarchy. For example, the top level of the master pipeline represents a sequence of stages for different environments. Each environment may include one or more pipelines for datacenter instances or pipelines for other types of datacenter entities. A datacenter instance pipeline 1010 may include service group pipelines 1020. Each service group pipeline 1020 may include one or more service pipelines 1030. A datacenter instance pipeline 1010 may include cell pipelines 1025, each cell pipeline 1025 comprising one or more service pipelines 1030. The service pipeline 1030 may comprise stages, each stage representing a pipeline representing instructions for deploying the service for specific environments. The lowest level pipeline or the leaf level pipeline in the hierarchy is referred to as a unit pipeline and may include detailed service specific instructions for performing an operation related to a service. For example, deployment for a service may include pre-deployment steps, deployment steps, post deployment steps, and post deployment test and validation step. A pipeline that is not a leaf level pipeline and has one or more child pipeline is an aggregate pipeline that orchestrates executions of the child pipelines.

A master pipeline may be driven by pull requests that occur a version control system for software receives a request for considering changes committed to an external repository for inclusion in a project's main repository. Accordingly, the master pipeline is automatically triggered when a pull request is received and deploys a software artifact based on the latest software version for which the pull request is received. The master pipeline performs continuous delivery of software artifacts based on pull requests. The master pipeline may be driven based on an on-demand manner, for example, by invoking a request using application programming interface (API) of the deployment module 210. The on-demand deployment based on master pipelines may be requested for any set of services and for any version for a given service as specified using the API. The master pipeline may be invoked to request a rollback from the current version to a previous version or a roll forward from the currently deployed version to a more recent version.

In an embodiment, the deployment module 210 creates a service master pipeline for each service. These pipelines get triggered when a pull request is received for a repository of the software. The deployment module 210 receives pipeline templates from users for specific services. These pipeline templates include detailed instructions for testing, validation, build, etc. for specific services. The datacenter generation module 220 receives a cloud platform independent declarative specifications for one or more datacenters. The datacenter generation module 220 generates (or configures) datacenters according to the received cloud platform independent declarative specifications. The deployment module 210 receives promotion decision 815 pipelines. The promotion decision 815 pipelines are integrated into the overall master pipeline.

The pipeline generator creates all pipelines for each datacenter from the templates and combines them via master pipelines in a hierarchical fashion, for example, as illustrated in FIG. 10. In an embodiment, the pipeline generator generates service pipelines for individual services; the pipeline generator generates cell master pipelines to invoke the service pipelines; the pipeline generator generates service group master pipelines to invoke cell master pipelines; the pipeline generator generates datacenter instance master pipelines to invoke service group pipelines; the pipeline generator generates a service master pipeline to invoke the datacenter instance master pipelines.

Following is a snippet of a master pipeline showing various stages. Each stage may specify attributes including a stage name, a type of pipeline, a stage type (e.g., master deployment pipeline or promotion pipeline), prior stages, and so on.

```
{
 "stages": [
  {
   "stage_name": "Artifact version map for service SVC",
   "stage_type": "version_map",
   "prior_stage_ids": [ ]
  },
  {
   "pipeline_type": "env-type-aggregate",
   "template_name": "deploy_dev.j2",
   "stage_name": "Deploy to dev env",
   "stage_type": "master_deployment_pipeline",
   "prior_stage_ids": [     " Artifact version map for service SVC"     ]
  },
  {
   "promote_to": "test",
   "template_name": "promote.j2",
   "pipeline_type": "promotion",
   "stage_name": "Promote to test env",
   "stage_type": "promotion",
   "prior_stage_ids": [     "Deploy to dev env"    ]
  },
  {
   "pipeline_type": "env-type-aggregate",
   "template_name": "deploy_test.j2",
   "stage_name": "Deploy to test env",
   "stage_type": "master_deployment_pipeline",
   "prior_stage_ids": [     "Promote to test env"    ]
  },
  {
   "promote_to": "stage",
   "template_name": "promote.j2",
   "pipeline_type": "promotion",
   "stage_name": "Promote to staging env",
   "stage_type": "promotion",
   "prior_stage_ids": [     "Deploy to test env"    ]
  },
  {
   "promote_to": "stage",
   "template_name": "promote.j2",
   "pipeline_type": "promotion",
   "stage_name": "Promote to staging env",
   "stage_type": "promotion",
   "prior_stage_ids": [    "Deploy to test env"   ]
  } ...
```

As shown in the examiner master pipeline, the first stage is an artifact version map. The next stage is a master deployment pipeline for deploying to development environment. The next stage is a promotion pipeline for determining whether the software artifact can be promoted to the next stage. The next stage is a master deployment pipeline for deploying to test environment. The next stage is a promotion pipeline for determining whether the software artifact can be promoted to the next stage that is staging environment.

Software Artifact Version Map

In an embodiment, the deployment module 210 receives an artifact version map that associates various software artifacts and their versions with datacenter entities. The artifact version map provides a declarative specification of the specific versions of software artifacts that need to be deployed for services in different datacenter entities. Each datacenter entity may be uniquely identified based on its location within the datacenter hierarchy as specified by the declarative specification of the datacenter. For example, for a service, a software library may act as a software artifact. The software artifact may have multiple versions, for example, V1, V2, V3, and so on. The artifact version map may specify that version V1 needs to be deployed in datacenter entities C1 and C2 and version V2 needs to be deployed in datacenter entities C3 and C4. The deployment module 210 generates master pipelines and instructions that ensure that the appropriate software artifact versions are deployed in the datacenter entities as specified in the artifact version map.

In an embodiment, the artifact version map is specified as a JSON (Javascript object notation) file, a YAML file, or a file using any other syntax for representing nested objects. The artifact version map may comprise a set of <service>: <version> key pairs that are associated with various datacenter entities distributed across a hierarchy of a datacenter. The artifact version map key pairs act as whitelists for corresponding pipelines. If a key for a service is not included into an artifact version map, all pipelines for that service are excluded during execution of the pipeline. Different artifact version maps may be applied to the same master pipeline resulting in different services being included/excluded during execution of the master pipeline.

Following is an example artifact version map. The artifact version map specifies environment types using the attribute "env_types". In the following example, the environment type development is specified. The environment type may include one or more datacenter instances; a datacenter instance may include one or more service groups, a service group may include one or more services. In the following example, the software artifact name is specified as library1 and version as version1 and is associated with the service instance instance001. However, the software artifact name and version may be associated with any level of datacenter entity in the hierarchy. For example, of the software artifact name and version is specified or a service group, the software artifact name and version is applicable to all services within the service group unless the software artifact name and version is overridden with different values of the software artifact name and version specified for a particular service instance within the service group. Similarly, the software artifact name and version can be specified for a datacenter instance and is applicable to all service groups or cells within the datacenter instance unless an overriding value is specified for a service group.

```
{
  "name": "artifact_version_map1",
  "schema_version": "0.1",
  "release_label": "release1.1",
  "deployments": {
    "env_types": [
```

-continued

```
      {
        "name": "development",
        "datacenter_instances": [
          {
            "name": "datacenter1",
            "service_group": [
              {
                "name": "service_group1",
                "services": [
                  {
                    "service_instance": "instance001",
                    "name": "service1",
                    "versions": [
                      {
                        "software_artifact_name": "library1",
                        "version": "version1"
                      }
                    ]
                  }
                ]
              }
            ]
          }
        ]
      }
    ],
  }
}
```

In an embodiment, the artifact version map specifies a datacenter entity using a full path of the datacenter entity, for example, "stagger_group1/datacenter1/service_group2/service1". In an embodiment, the artifact version map specifies a set of datacenter entities using regular expressions in the full path of the datacenter entity. For example, a full path that includes service_group[?] includes service_group1, service_group2, service_group3, and so on.

Following is an example of an artifact version map specifying regular expressions to define a set of services. The environment types are specified as dev and test and the datacenter entities in the full path including datacenter instances and service groups are specified as wildcards and service instances are specified as "service*". Accordingly, for all datacenter instances for dev and test environments, for all service groups, for services names matching service*, the version V1 of application app1 will be deployed.

```
env_types:
  - name: "dev|test"
    datacenter_instances:
      - name: "(.*)"
        service_group:
          - name: "(.*)"
            services:
              - service_instance: "service*"
                name: "app1"
                versions:
                  version: "V1"
```

In some embodiments, the artifact version map may specify parameters used by pipelines. Accordingly, the specified parameters will be applicable to a stagger group for which the parameter is specified.

The following process is used for deployment of software artifacts on datacenters configured on a cloud platform according to an embodiment. The datacenter generation module generates one or more datacenters on a target cloud platform. Each datacenter is generated from a cloud platform independent declarative specification and has a hierarchy of datacenter entities.

The software release management module 230 receives as input, an artifact version map that maps datacenter entities to versions of software artifacts. The software release management module 230 also receives as input, a cloud platform independent master pipeline.

The software release management module 230 compiles the cloud platform independent master pipeline in conjunction with the artifact version map to generate a cloud platform specific detailed pipeline. In an embodiment, the generated cloud platform specific detailed pipeline includes artifact version map filters before certain stages to determine whether certain stages should be enabled or disabled according to the artifact version map.

The software release management module 230 further receives code for releasing one or more features of services deployed on the datacenter. For example, the code may represent source code obtained from a version control management system storing source code repositories to which changes are submitted by developers. The software release management module 230 executes the cloud platform specific deployment pipeline to deploy software artifacts based on the received code.

The artifact version map and master pipelines can be used to orchestrate various types of operations related to continuous delivery of software artifacts in a cloud-based datacenter. The artifact version map and the master pipelines can be configured to perform aggregate retry operations for a service or a service group or any datacenter entity. The artifact version map includes configurations of retry operations for a datacenter entity, including the retry strategy, a threshold number of retries to perform in case of failure to execute a stage of a pipeline, whether confirmation from a user is required before retrying or retry is performed automatically, and so on. For example, a retry strategy may be a fixed backoff strategy that pauses execution for a fixed period of time before retrying. Other retry strategies may be configured using artifact version map and master pipelines. In an embodiment, the pipeline generator introduces an invoke retrier stage within an aggregate pipeline to trigger a retry strategy if a previous pipeline stage fails. The retry strategy and configuration parameters specified for a datacenter entity applies to all datacenter entities and services within the datacenter entity unless the value is overridden for a nested datacenter entity.

Change Management for Services Deployed on a Datacenter

In an embodiment, the software release management module 230 manages changes made to services installed or executing in datacenters. The software release management module 230 accesses a datacenter configured on a target cloud platform. The datacenter executes a set of services. The software release management module 230 receives a modification of the set of services executing on the datacenter, for example, addition of a service to a datacenter entity, deletion of a service from a datacenter entity, changes to configuration of a service, changes to a software artifact associated with a service, and so on.

The software release management module 230 generates a master pipeline for deploying services on a target cloud platform. The master pipeline comprises: (1) a plurality of stages comprising instructions for deploying services, each stage corresponding to a system environment, for example, a development environment stage, a test environment stage, a canary environment stage, and a production environment stage and (2) a change management stage comprising instructions for interacting with a change management system. The software release management module 230 compiles the master pipeline to generate a set of pipelines corresponding to the set of services.

Each generated pipeline includes a change management stage. The software release management module 230 executes each of the set of pipelines. The execution of the change management stage of a pipeline provides a status of deployment of one or more services to the change management system. Accordingly, the status of deployment of all services in the requested change is provided to the change management system.

System Architecture of Change Processing Module

Figure 11:
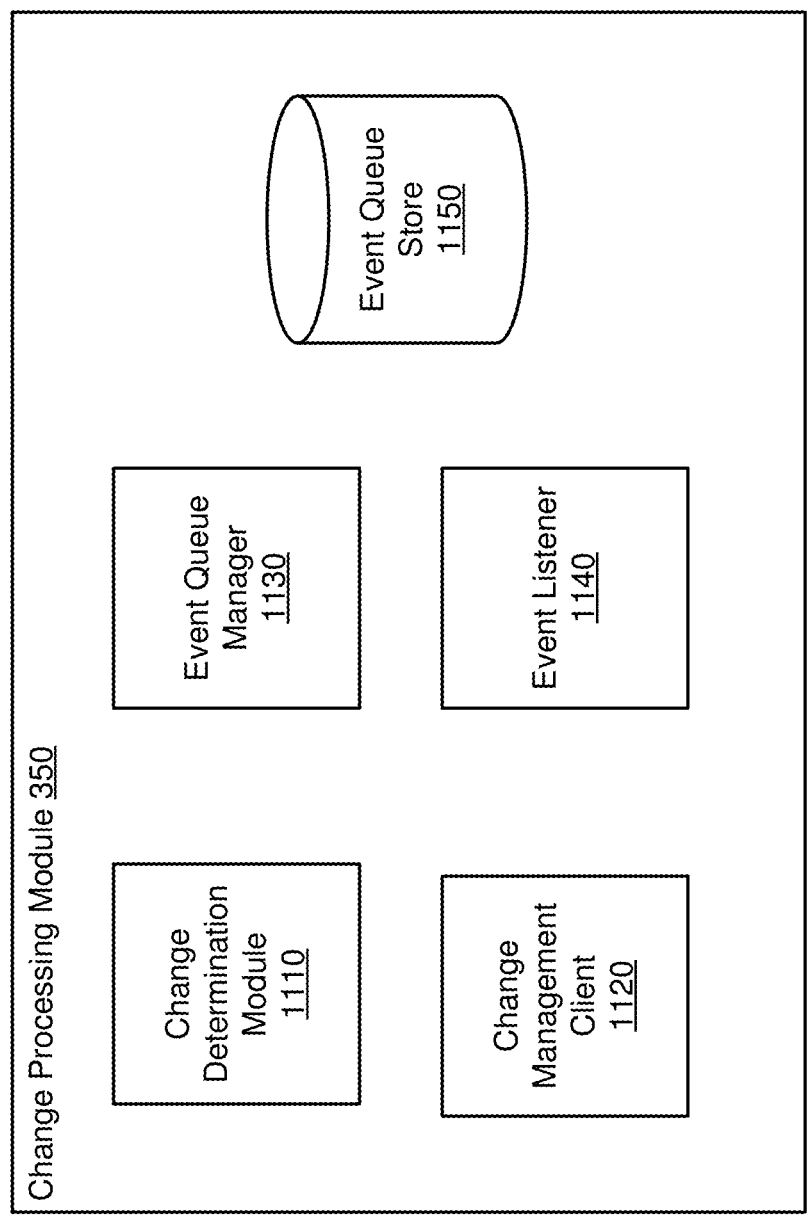
FIG. 11 shows the system architecture of a change processing module according to an embodiment.

FIG. 11 shows the system architecture of a change processing module according to an embodiment. The change processing module 350 includes a change determination module 1110, a change management client 1120, an event queue manager 1130, an event listener, and an event queue store 1150. Other embodiments may include more or fewer components than those indicated herein in FIG. 11.

The change determination module 1110 identifies the changes being performed to the services installed in one or more datacenters. In an embodiment, the change determination module 1110 receives a set of instructions that identify the changes to be performed compared to the current configuration of services on a datacenter. For example, the changes may specify new services to be added, existing services to be removed, service configurations that need to be modified, and so on.

In an embodiment, the change determination module 1110 stores various versions of the artifact version map. The software release management module 230 stores a version V1 of the artifact version map that corresponds to the current configuration of the datacenter on a target cloud computer. The software release management module 230 receives a version V2 of the artifact version map that needs to be implemented on target cloud computer. The version V2 of the artifact version map has differences compared to the version V1. The change determination module 1110 compares the two versions of the artifact version map to determine the differences between them. Accordingly, the change determination module 1110 compares a new version of the artifact version map received with a previous version of the artifact version map that is currently being deployed to identify the changes that are requested in the new version of the artifact version map. The changes may include new services that need to be installed on specific datacenter entities, versions of existing services that need to be changed (e.g., upgraded) on specific datacenter entities, services that need to be removed from specific datacenter entities, and so on. The pipeline generator generates a master pipeline to implement the requested changes to the service configurations.

The change management client 1120 interacts with a change management system to store information describing changes being performed. The change management system may be any system that stores records describing changes and manages tasks related to changes, for example, sending alerts or messages related to the change, receiving approvals for specific changes, and so on. The change management client 1120 invokes APIs of the change management system to interact with the change management system. The change management system may be an external system that provides change management as a service.

The event queue manager 1130 creates and manages queues that store events related to deployment tasks. The event queue manager 1130 may create queues for various teams that need to be informed of specific events. For example, a team may be responsible for a datacenter entity as defined in the declarative specification of a datacenter. The change processing module identifies specific events such as failures or success events for services installed in the datacenter entity and informs the team. The event listener 1140 listens to events in the pipeline execution engine 360. The events describe detailed actions performed for each pipeline, for example, whether a particular stage was executed successfully or failed to execute, or whether a particular stage generated a message, and so on. The event listener 1140 classifies the events and relates them to specific datacenter entities. Accordingly, the event listener 1140 provides the information describing the events to the event queue manager 1130 for storing in event queues. The event queue store 1150 stores the different queues, for example, a queue for one or more teams defined in the declarative specification of datacenters.

Figure 12:
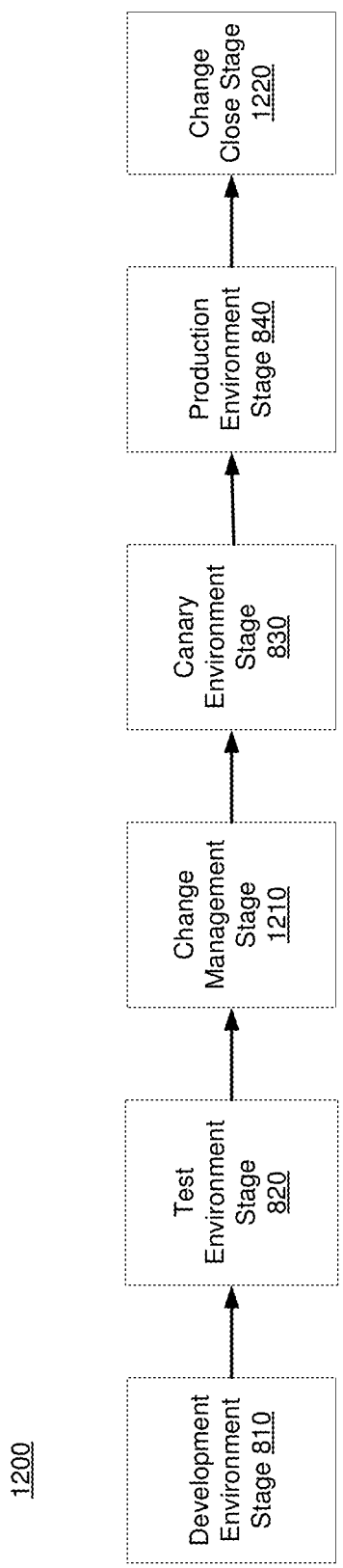
FIG. 12 shows an example master pipeline for managing changes according to an embodiment.

FIG. 12 shows an example master pipeline for managing changes according to an embodiment. The master pipeline includes stages similar to those shown in FIG. 8 corresponding to different system environments through which a software artifact is promoted for deployment to a datacenter. Accordingly, the master pipeline 1200 includes stages for different environments of datacenter including development environment, test environment, canary environment, and production environment. The master pipeline further includes a change management stage and Accordingly, the master pipeline 1200 includes a development environment stage 810 which feeds into a test environment stage 820, which feeds into a change management stage 1210, which feeds into a canary environment pipeline 830, which feeds into production environment pipeline 840, which feeds into a change close stage 1220. Each stage represents a pipeline that is executed for that stage.

The master pipeline represents a set of pipelines that form a hierarchy, for example, a pipeline corresponding to each datacenter entity of the hierarchy of datacenter entities formed by the datacenter as specified by a declarative specification used for generating the datacenter. The change management stage of each pipeline performs actions related to management of the change represented by the master pipeline. For example, the change management stage includes instructions for performing interactions with the change management system.

In an embodiment, the change management stage includes instructions for creating a change case in the change management system that represents the set of changes performed by the master pipeline. A change case of the change management system represents information describing a set of changes performed to services of the datacenter. The set of changes may be stored as one or more records in a databased of the change management system.

In an embodiment, a configuration file, for example, the artifact version map includes information describing an existing change case to be used for storing information describing the set of changes being performed to the services of the datacenter. For example, a user such as a system administrator may create a change case and provide in the configuration file for use by the change management stage.

The change management stages of various pipelines represented by the master pipeline provide status of deployment of various services to the change management system for storing in connection with the change case. For example, the pipeline for a particular service provides status of deployment of that service to the change management system. The status may indicate whether the deployment was successful, whether the deployment failed, whether the deployment generated errors or warnings, and so on.

The change close stage closes the change case if the deployment of all services as specified by the artifact version map was successful. Closing a change case prevents further modifications to be made to the change case, for example, further information may not be stored in the change case. However, a user can review the information stored in the change case, for example, for auditing specific changes made to services.

Process of Change Management

Figure 13:
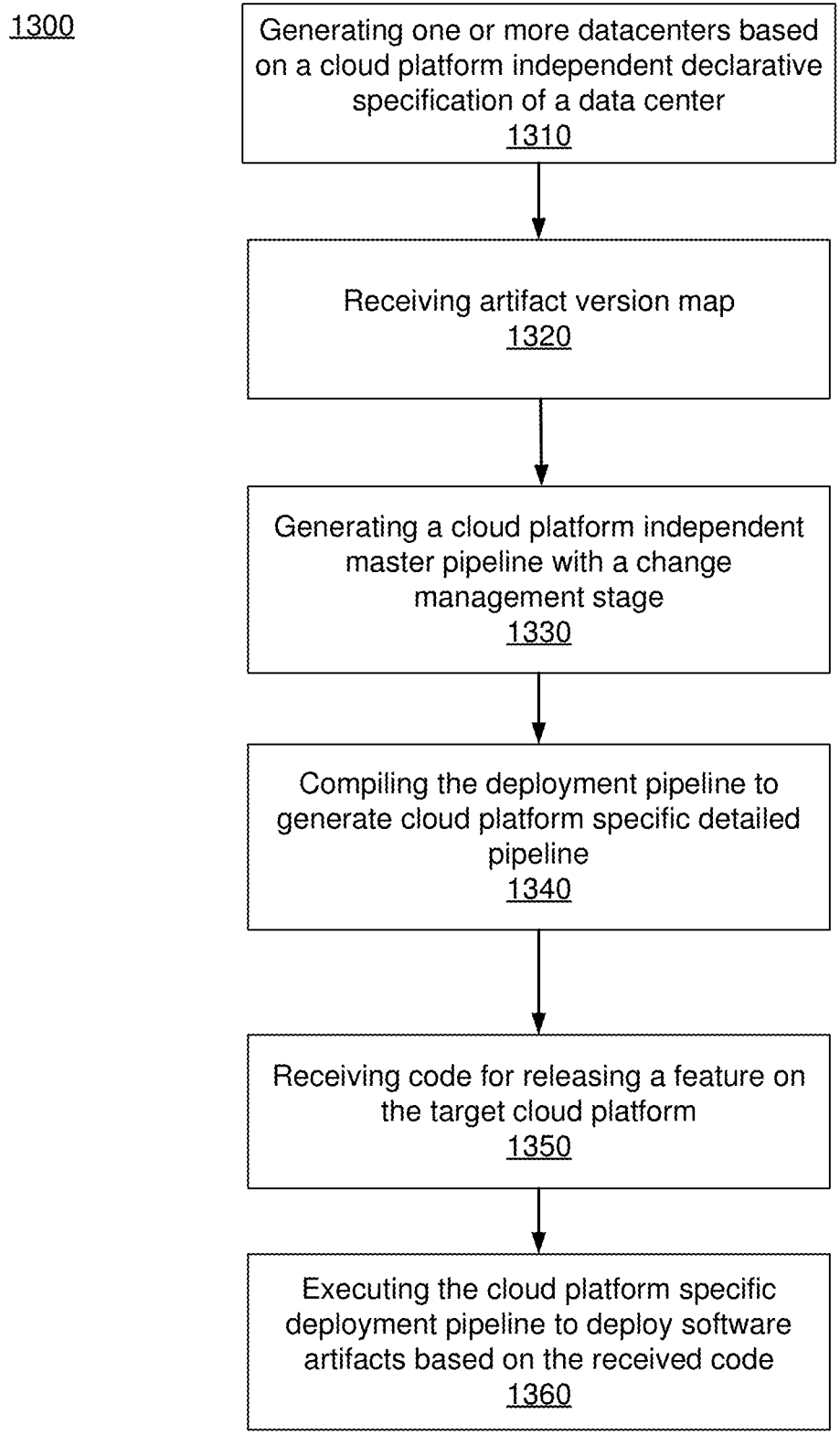
FIG. 13 shows the overall process for change management of services deployed on datacenters configured on a cloud platform according to an embodiment.

FIG. 13 shows the overall process of change management of services deployed on datacenters configured on a cloud platform according to an embodiment. The datacenter generation module 220 generates 1310 one or more datacenters based on a cloud platform independent declarative specification, for example, as shown in the processes illustrated in FIGS. 6 and 7. Each datacenter has a set of services deployed in the datacenter. The software release management module 230 receives 1320 an artifact version map that includes information describing any changes that need to be made to the services installed and executing in a datacenter. For example, the changes may comprise adding new services to the datacenter, removing services currently deployed in a datacenter, changing configuration of a service, deploying a new version of a software artifact for a service, and so on.

The software release management module 230 generates 1330 a cloud platform independent master pipeline that includes a change management stage, for example, the master pipeline as illustrated in FIG. 12. The cloud platform independent master pipeline may also include a change close stage at the end of the pipeline. The software release management module 230 compiles 1340 the cloud platform independent master pipeline to generate a cloud platform specific detailed pipeline that includes instructions for deploying services according to the artifact version map on a datacenter deployed on a target cloud platform.

The software release management module 230 receives source code for compiling to build software artifacts and deploy them on the target cloud platform. The software release management module 230 executes the cloud platform specific detailed pipelines to deploy the appropriate versions of software artifacts according to the artifact version map. The execution of the cloud platform specific detailed pipelines causes execution of the change management stages for each service that is being deployed according to the artifact version map. The execution of the change management stage for the master pipeline may cause the creation of a change case in the change management system. The execution of the change management stage of the pipelines for individual services send the status of the execution of the pipelines for storing in connection with the change case in the change management system. The execution of the change management stage of the pipelines for an individual service may cause the pipeline to wait for approval before promoting the software artifact processed by the pipeline to a subsequent stage, for example, from test stage to a canary stage or from canary stage to a production stage. The execution of the change close stage of the master pipeline causes the change case to be closed so that no more modifications can be recorded in the change case.

Figure 14:
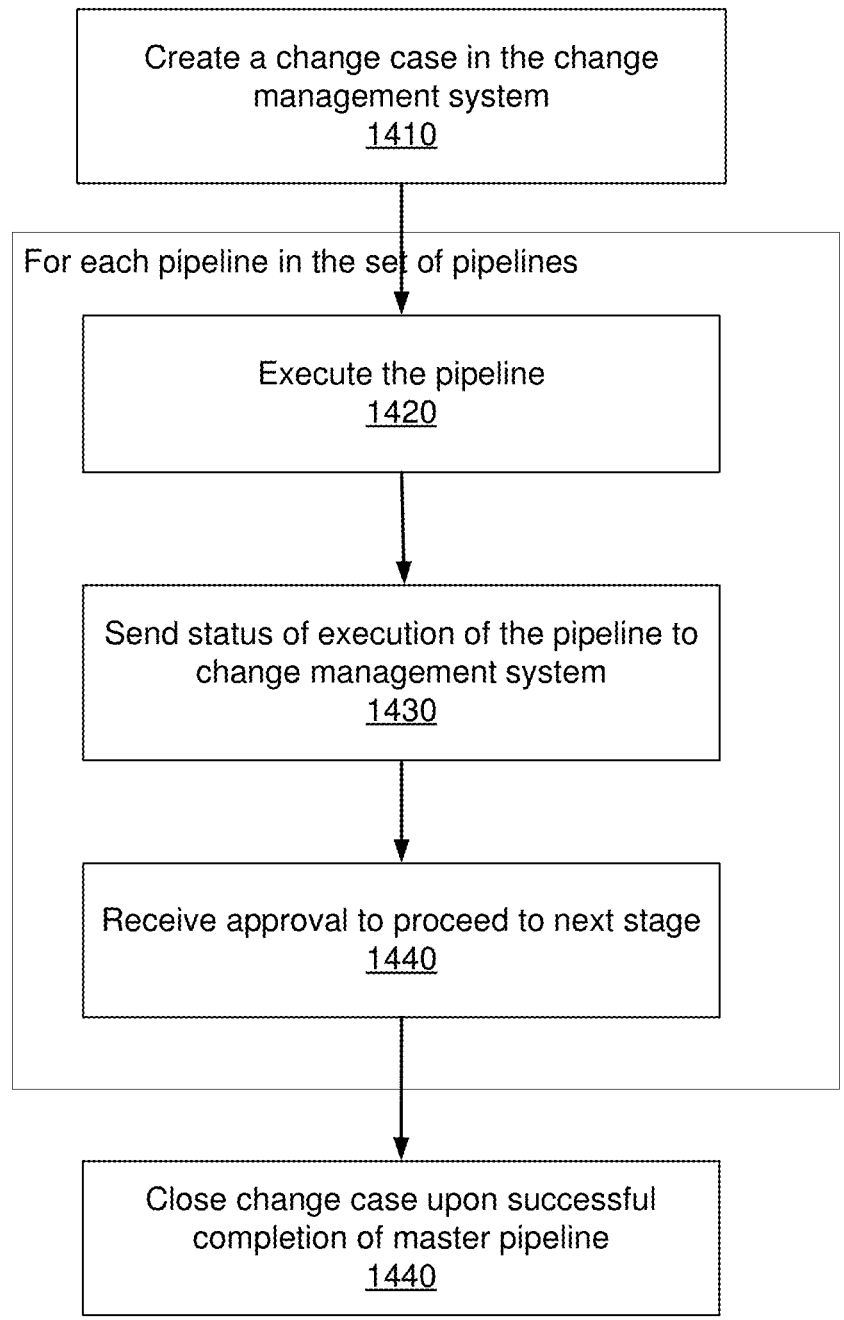
FIG. 14 shows the process performed by a change management stage of a master pipeline according to an embodiment.

FIG. 14 shows the process performed by a change management stage of a master pipeline according to an embodiment. The software release management module 230 creates 1410 a change case in the change management system. The cloud platform independent master pipeline comprises a set of pipelines including at least a pipeline for each service that is being deployed or modified in the datacenter. Each pipeline from the set includes a change management stage.

The software release management module 230 repeats the steps 1420, 1430, and 1440 for each pipeline associated with a service in the datacenter. The software release management module 230 executes 1420 the pipeline associated with a service. The software release management module 230 sends 1430 the status of execution of the pipeline to the change management system. The software release management module 230 receives an approval to proceed to the next stage. The approval may be received from a user or a team associated with the service. If the software release management module 230 receives an indication that the promotion to the next stage is not approved, the software release management module 230 executes steps to repeat some of the steps of the pipeline, for example, after receiving a revised source code or a modified software artifact. For example, the approval may be denied if the number of test cases that passed was below a threshold. Accordingly, the source code is revised, and the steps repeated so that at least the threshold number of test cases are passed so the approval is received. Once all pipelines in the set of pipelines are approved and the set of pipelines executed successfully, the software release management module 230 executes the close change stage that causes the change case to be closed.

In an embodiment, the software release management module 230 monitors events recorded by the pipeline execution engine that indicate the status of each action performed by the pipeline execution engine. The software release management module 230 analyzes each event in the context of the datacenter to determine whether the event is significant enough to be recorded in the change case and then sends information describing the event to a queue for reporting to a team associated with the service.

Figure 15:
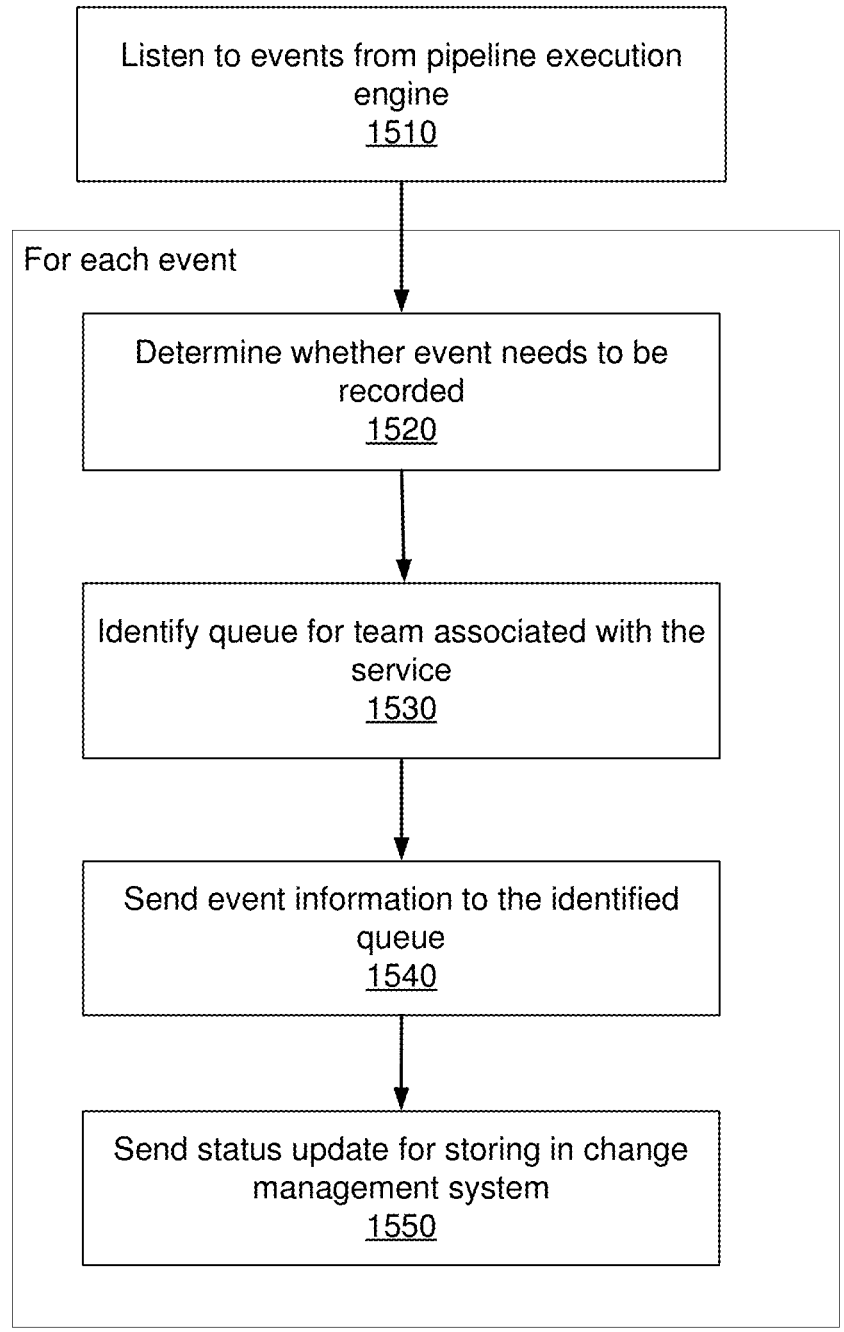
FIG. 15 shows the process for managing queues for collecting event information related to changes according to an embodiment.

FIG. 15 shows the process for managing queues for collecting event information related to changes in service configurations according to an embodiment. The event listener 1140 of the change processing module 350 listens 1510 to events from the pipeline execution engine. For each event the change processing module 350 performs the following steps 1520, 1530, 1540, and 1540. The change processing module 350 determines the service for which the event was generated. Accordingly, the change processing module 350 evaluates the event to determine whether the event is significant enough to be recorded by the change management system and reported to the team associated with the service. If the change processing module 350 determines that the event is significant enough to be recorded and reported, the change processing module 350 identifies 1530 a queue for a team associated with the service. The change processing module 350 sends 1540 the event information to the identified queue. The event is reported to the team associated with the service via the queue. The change processing module 350 sends 1550 a status update based on the event for storing in associated with the change case to the change management system.

Computer Architecture

Figure 16:
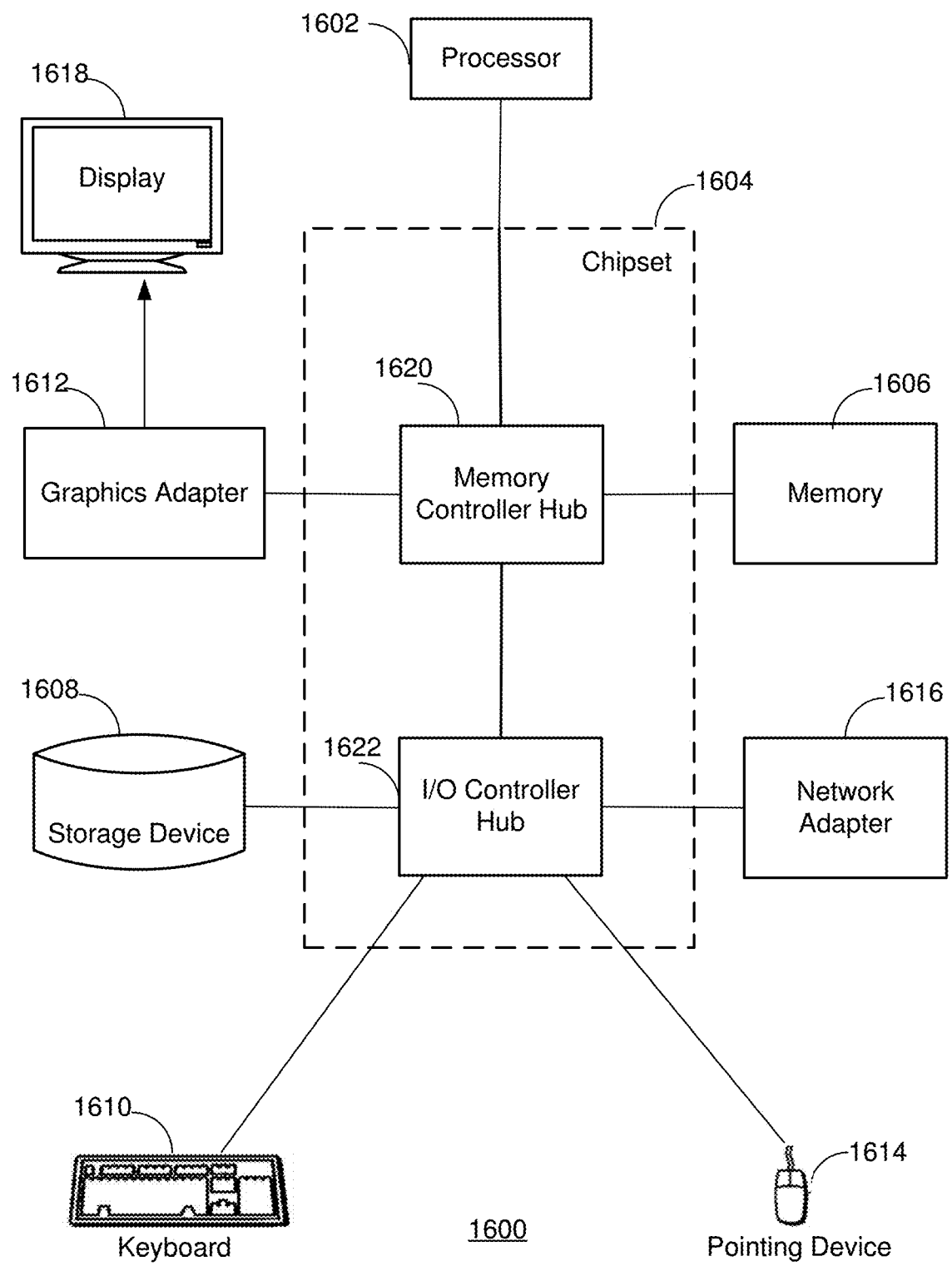
FIG. 16 is a block diagram illustrating a functional view of a typical computer system for use in the environment of FIG. 1 according to one embodiment.

FIG. 16 is a high-level block diagram illustrating a functional view of a typical computer system for use as one of the entities illustrated in the environment 100 of FIG. 1 according to an embodiment. Illustrated are at least one processor 1602 coupled to a chipset 1604. Also coupled to the chipset 1604 are a memory 1606, a storage device 1608, a keyboard 1610, a graphics adapter 1612, a pointing device 1614, and a network adapter 1616. A display 1618 is coupled to the graphics adapter 1612. In one embodiment, the functionality of the chipset 1604 is provided by a memory controller hub 1620 and an I/O controller hub 1622. In another embodiment, the memory 1606 is coupled directly to the processor 1602 instead of the chipset 1604.

The storage device 1608 is a non-transitory computer-readable storage medium, such as a hard drive, compact disk read-only memory (CD-ROM), DVD, or a solid-state memory device. The memory 1606 holds instructions and data used by the processor 1602. The pointing device 1614 may be a mouse, track ball, or other type of pointing device, and is used in combination with the keyboard 1610 to input data into the computer system 200. The graphics adapter 1612 displays images and other information on the display 1618. The network adapter 1616 couples the computer system 1600 to a network.

As is known in the art, a computer 1600 can have different and/or other components than those shown in FIG. 16. In addition, the computer 1600 can lack certain illustrated components. For example, a computer system 1600 acting as a multi-tenant system 110 may lack a keyboard 1610 and a pointing device 1614. Moreover, the storage device 1608 can be local and/or remote from the computer 1600 (such as embodied within a storage area network (SAN)).

The computer 1600 is adapted to execute computer modules for providing the functionality described herein. As used herein, the term "module" refers to computer program instruction and other logic for providing a specified functionality. A module can be implemented in hardware, firmware, and/or software. A module can include one or more processes, and/or be provided by only part of a process. A module is typically stored on the storage device 1608, loaded into the memory 1606, and executed by the processor 1602.

The types of computer systems 1600 used by the entities of a system environment can vary depending upon the embodiment and the processing power used by the entity. For example, a client device may be a mobile phone with limited processing power, a small display 1618, and may lack a pointing device 1614. A multi-tenant system or a cloud platform, in contrast, may comprise multiple blade servers working together to provide the functionality described herein.

Additional Considerations

The particular naming of the components, capitalization of terms, the attributes, data structures, or any other programming or structural aspect is not mandatory or significant, and the mechanisms that implement the embodiments described may have different names, formats, or protocols. Further, the systems may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain embodiments described herein include process steps and instructions described in the form of an algorithm. It should be noted that the process steps and instructions of the embodiments could be embodied in software, firmware or hardware, and when embodied in software, could be downloaded to reside on and be operated from different platforms used by real time network operating systems.

The embodiments described also relate to apparatuses for performing the operations herein. An apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present embodiments are not described with reference to any particular programming language. It is appreciated that a variety of programming languages may be used to implement the teachings of the embodiments as described herein.

The embodiments are well suited for a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes and may not have been selected to delineate or circumscribe the inventive subject matter. Accordingly, the disclosure of the embodiments is intended to be illustrative, but not limiting.

We claim:

1. A computer implemented method for managing changes to services executing in datacenters configured on cloud platforms, the method comprising:

accessing a datacenter configured on a target cloud platform, the datacenter executing a set of services, the datacenter comprising a hierarchy of datacenter entities, wherein each datacenter entity comprises (1) one or more services or (2) one or more other datacenter entities;

receiving a modification of the set of services executing on the datacenter;

generating a master pipeline for deploying services on a target cloud platform, the master pipeline comprising:
 a plurality of stages comprising instructions for deploying services, each stage corresponding to a system environment, wherein at least some of the system environments belong to a list comprising a development environment, a test environment, and a production environment; and
 a change management stage comprising instructions for interacting with a change management system;

compiling the master pipeline to generate a set of pipelines corresponding to the set of services, each generated pipeline including a change management stage; and executing each of the set of pipelines, wherein execution of the change management stage of a pipeline provides a status of deployment of one or more services to the change management system.

2. The computer implemented method of claim 1, further comprising:

receiving an auditing request for a specific change in a particular service deployed in the datacenter;

responsive to receiving the auditing request, identifying a status of deployment of the particular service from the change management system; and providing the identified status of deployment of the particular service in response to the auditing request.

3. The computer implemented method of claim 1, wherein the change management stage of the master pipeline occurs before the stage for the production environment.

4. The computer implemented method of claim 1, wherein the set of pipelines form a hierarchy corresponding to the hierarchy of datacenter entities in the datacenter.

5. The computer implemented method of claim 1, wherein the master pipeline promotes a software artifact for a service through a set of system environments.

6. The computer implemented method of claim 5, wherein a stage of the master pipeline includes instructions for executing a set of test cases for determining whether to promote the software artifact from the current stage to the next stage.

7. The computer implemented method of claim 1, wherein the master pipeline comprises a hierarchy of pipelines having a hierarchical structure corresponding to the hierarchy of datacenter entities specified by a cloud platform independent declarative specification.

8. The computer implemented method of claim 7, wherein the hierarchy of pipelines comprises a datacenter instance pipeline comprising one or more service group pipelines, wherein a service group pipeline comprises one or more service pipelines.

9. The computer implemented method of claim 7, wherein a change management stage of a generated pipeline includes instructions to wait for an approval to proceed to the next stage.

10. The computer implemented method of claim 1, further comprising:

receiving a cloud platform independent declarative specification; and compiling the cloud platform independent declarative specification to generate a cloud platform specific datacenter representation.

11. The computer implemented method of claim 10, wherein compiling the cloud platform independent declarative specification comprises:
generating a first version of a cloud platform independent detailed metadata representation of the datacenter from the cloud platform independent declarative specification; and
generating a second version of the cloud platform independent detailed metadata representation of the datacenter from a modified declarative specification.

12. The computer implemented method of claim 11, further comprising:
generating a platform specific detailed metadata representation for the target cloud platform based on the first version of the cloud platform independent detailed metadata representation; and
deploying the datacenter on the target cloud platform based on the platform specific detailed metadata representation.

13. The computer implemented method of claim 10, wherein the cloud platform independent declarative specification comprises definitions of one or more datacenter instances, each datacenter instance including one or more service groups, wherein each service group comprises a set of services.

14. The computer implemented method of claim 1, wherein the modification of the set of services executing on the datacenter is specified via an artifact version map.

15. The computer implemented method of claim 14, further comprising:
determining the modification of the set of services executing on the datacenter by comparing the artifact version map with a previously received artifact version map.

16. A non-transitory computer readable storage medium for storing instructions that when executed by a computer processor cause the computer processor to perform steps for configuring datacenters in a cloud platform, the steps comprising:
accessing a datacenter configured on a target cloud platform, the datacenter executing a set of services, the datacenter comprising a hierarchy of datacenter entities, wherein each datacenter entity comprises (1) one or more services or (2) one or more other datacenter entities;
receiving a modification of the set of services executing on the datacenter;
generating a master pipeline for deploying services on a target cloud platform, the master pipeline comprising:
a plurality of stages comprising instructions for deploying services, each stage corresponding to a system environment, wherein at least some of the system environments belong to a list comprising a development environment, a test environment, and a production environment; and
a change management stage comprising instructions for interacting with a change management system;
compiling the master pipeline to generate a set of pipelines corresponding to the set of services, each generated pipeline including a change management stage; and
executing each of the set of pipelines, wherein execution of the change management stage of a pipeline provides a status of deployment of one or more services to the change management system.

17. The non-transitory computer readable storage medium of claim 16, wherein the instructions further cause the computer processor to perform steps comprising:
receiving an auditing request for a specific change in a particular service deployed in the datacenter;
responsive to receiving the auditing request, identifying a status of deployment of the particular service from the change management system; and
providing the identified status of deployment of the particular service in response to the auditing request.

18. The non-transitory computer readable storage medium of claim 16, wherein the change management stage of the master pipeline occurs before the stage for the production environment.

19. The non-transitory computer readable storage medium of claim 16, wherein the instructions further cause the computer processor to perform steps comprising:
determining the modification of the set of services executing on the datacenter by comparing an artifact version map with a previously received artifact version map.

20. A computer system comprising:
a computer processor; and
a non-transitory computer readable storage medium for storing instructions that when executed by the computer processor, cause the computer processor to perform steps for configuring datacenters in a cloud platform, the steps comprising;
accessing a datacenter configured on a target cloud platform, the datacenter executing a set of services, the datacenter comprising a hierarchy of datacenter entities, wherein each datacenter entity comprises (1) one or more services or (2) one or more other datacenter entities;
receiving a modification of the set of services executing on the datacenter;
generating a master pipeline for deploying services on a target cloud platform, the master pipeline comprising:
a plurality of stages comprising instructions for deploying services, each stage corresponding to a system environment, wherein at least some of the system environments belong to a list comprising a development environment, a test environment, and a production environment; and
a change management stage comprising instructions for interacting with a change management system;
compiling the master pipeline to generate a set of pipelines corresponding to the set of services, each generated pipeline including a change management stage; and
executing each of the set of pipelines, wherein execution of the change management stage of a pipeline provides a status of deployment of one or more services to the change management system.

* * * * *